(12) United States Patent
Inakoshi et al.

(10) Patent No.: US 10,401,185 B2
(45) Date of Patent: Sep. 3, 2019

(54) APPARATUS AND METHOD FOR ONLINE GENERATION OF AN OPTIMUM ROUTE-GRAPH

(71) Applicant: FUJITSU LIMITED, Kawasaki-shi, Kanagawa (JP)

(72) Inventors: Hiroya Inakoshi, Tama (JP); Hiroaki Morikawa, Kawasaki (JP); Tatsuya Asai, Kawasaki (JP); Junichi Shigezumi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 310 days.

(21) Appl. No.: 15/297,812

(22) Filed: Oct. 19, 2016

(65) Prior Publication Data

US 2017/0122760 A1    May 4, 2017

(30) Foreign Application Priority Data

Nov. 4, 2015   (JP) .................. 2015-216883

(51) Int. Cl.
*G01C 21/36*   (2006.01)
*G01C 21/34*   (2006.01)

(52) U.S. Cl.
CPC ......... *G01C 21/36* (2013.01); *G01C 21/3453* (2013.01)

(58) Field of Classification Search
CPC ..................... G01C 21/36; G01C 21/3453
(Continued)

(56) References Cited

U.S. PATENT DOCUMENTS 6,392,646 B1   5/2002   Yamrom et al.
9,146,299 B2 *  9/2015   Chao ................. G01S 19/42
(Continued)

FOREIGN PATENT DOCUMENTS

CN   104700617 A  *  6/2015
JP   2001-209667 A    8/2001
(Continued)

OTHER PUBLICATIONS

Machine Translation CN 104700617; published Jun. 2015 (Year: 2015).*

(Continued)

*Primary Examiner* — Anne M Antonucci
*Assistant Examiner* — James E Stroud
(74) *Attorney, Agent, or Firm* — Westerman, Hattori, Daniels & Adrian, LLP

(57) ABSTRACT

An apparatus acquires a first piece of trajectory information from among plural pieces of trajectory information, and acquires a first planar graph from among one or more planar graphs. The apparatus generates a second planar graph, based on the first planar graph and plural pieces of position information included in the first piece of trajectory information, and extracts, from among the plural pieces of trajectory information, second pieces of trajectory information indicating trajectories passing a difference portion between the first and second planar graphs. For each of candidate graphs each obtained by excluding a reduction set of edges from the second planar graph, the apparatus calculates optimality of the each candidate graph with which an addition set of trajectories indicated by the first and second pieces of trajectory information are associated, and outputs one of the candidate graphs determined based on the calculated optimality.

20 Claims, 13 Drawing Sheets

(58) Field of Classification Search
USPC .......................................................... 701/522
See application file for complete search history.

(56) References Cited

U.S. PATENT DOCUMENTS

| | | | |
|---|---|---|---|
| 9,460,713 B1* | 10/2016 | Moreno Mengibar | ...................... G10L 15/197 |
| 2001/0018760 A1 | 8/2001 | Matsumoto | |
| 2004/0023612 A1* | 2/2004 | Kriesel | ................ A01K 11/008 452/157 |
| 2005/0257748 A1* | 11/2005 | Kriesel | ................ A01K 11/008 119/51.02 |
| 2013/0179067 A1 | 7/2013 | Trowbridge et al. | |
| 2014/0232725 A1 | 8/2014 | Ihara | |
| 2015/0106392 A1* | 4/2015 | Inakoshi | ........... G06F 17/30324 707/752 |

FOREIGN PATENT DOCUMENTS

| | | |
|---|---|---|
| JP | 2003-518302 A | 6/2003 |
| JP | 2004-118290 A | 4/2004 |
| JP | 2011-223419 A | 11/2011 |
| JP | 2012-14458 A | 1/2012 |
| JP | 2013-90799 A | 5/2013 |
| JP | 2013-545078 A | 12/2013 |
| JP | 2014-45919 A | 3/2014 |
| JP | 2015-76069 A | 4/2015 |
| WO | 2012/050932 A1 | 4/2012 |

OTHER PUBLICATIONS

Lee et al., "Trajectory Clustering: A Partition -and-Group Framework", SIGMOD '07 pp. 1-12, Jun. 11-14, 2007, Beijing, China (cited in the specification).

Office Action dated Jun. 11, 2019, issued in counterpart JP Application No. 2015-216883, with English machine translation. (10 pages).

* cited by examiner

FIG. 2

| TRAJECTORY ID | OBSERVATION POINT ID | x COORDINATE | y COORDINATE | OBSERVATION TIME |
|---|---|---|---|---|
| $\alpha_1$ | $P_{11}$ | $x_{11}$ | $y_{11}$ | $s_{11}$ |
| $\alpha_1$ | $P_{12}$ | $x_{12}$ | $y_{12}$ | $s_{12}$ |
| ... | | | | |

| NODE INFORMATION | | | EDGE INFORMATION | |
|---|---|---|---|---|
| NODE ID | x COORDINATE | y COORDINATE | EDGE ID | COUPLING NODE |
| $N_1$ | $x_{N1}$ | $y_{N1}$ | $e_1$ | $N_1\_N_2$ |
| $N_2$ | $x_{N2}$ | $y_{N2}$ | $e_2$ | $N_2\_N_3$ |
| $N_3$ | $x_{N3}$ | $y_{N3}$ | $e_3$ | $N_3\_N_4$ |
| ... | | | ... | |

| TRAJEC-TORY ID | ROUTE $\pi$ | DISSIMILARITY $\delta_\alpha(G)$ |
|---|---|---|
| $\alpha^{(1)}$ | $\langle e_1, e_9, e_{11}, e_{13}, e_{14}, e_{15}, e_8 \rangle$ | 4 |
| | | |
| | | |

24A

| EDGE ID | TRAJECTORY DATA SET |
|---|---|
| $e_1$ | $\{\alpha^{(1)}\}$ |
| | |
| | |
| | |
| | |
| | |
| | |
| $e_8$ | $\{\alpha^{(1)}\}$ |
| $e_9$ | $\{\alpha^{(1)}\}$ |
| | |
| $e_{11}$ | $\{\alpha^{(1)}\}$ |
| | |
| $e_{13}$ | $\{\alpha^{(1)}\}$ |
| $e_{14}$ | $\{\alpha^{(1)}\}$ |
| $e_{15}$ | $\{\alpha^{(1)}\}$ |

24B

24

LOOP 1 (t=1)

FIG. 12

| TRAJEC-TORY ID | ROUTE $\pi$ | DISSIMILARITY $\delta_\alpha(G)$ |
|---|---|---|
| $\alpha^{(1)}$ | $\langle e_1, e_9, e_{11}, e_{13}, e_{14}, e_{15}, e_8 \rangle$ | 4 |
| $\alpha^{(2)}$ | $\langle e_1, e_2, e_{10}, e_{11}, e_{13}, e_{14}, e_{15}, e_8 \rangle$ | 3 |

24A

| EDGE ID | TRAJECTORY DATA SET |
|---|---|
| $e_1$ | $\{\alpha^{(1)}, \alpha^{(2)}\}$ |
| $e_2$ | $\{\alpha^{(2)}\}$ |
| $e_8$ | $\{\alpha^{(1)}, \alpha^{(2)}\}$ |
| $e_9$ | $\{\alpha^{(1)}\}$ |
| $e_{10}$ | $\{\alpha^{(2)}\}$ |
| $e_{11}$ | $\{\alpha^{(1)}, \alpha^{(2)}\}$ |
| $e_{13}$ | $\{\alpha^{(1)}, \alpha^{(2)}\}$ |
| $e_{14}$ | $\{\alpha^{(1)}, \alpha^{(2)}\}$ |
| $e_{15}$ | $\{\alpha^{(1)}, \alpha^{(2)}\}$ |

24B

24

LOOP 2 (t=2)

| TRAJEC-TORY ID | ROUTE $\pi$ | DISSIMILARITY $\delta_\alpha(G)$ |
|---|---|---|
| $\alpha^{(1)}$ | $\langle e_1, e_9, e_{11}, e_{13}, e_{14}, e_{15}, e_8 \rangle$ | 4 |
| $\alpha^{(2)}$ | $\langle e_1, e_2, e_{10}, e_{11}, e_{13}, e_{14}, e_{15}, e_8 \rangle$ | 3 |
| $\alpha^{(3)}$ | $\langle e_1, e_2, e_3, e_{12}, e_{13}, e_{14}, e_{15}, e_8 \rangle$ | 3 |

24B

| EDGE ID | TRAJECTORY DATA SET |
|---|---|
| $e_1$ | $\{\alpha^{(1)}, \alpha^{(2)}, \alpha^{(3)}\}$ |
| $e_2$ | $\{\alpha^{(1)}, \alpha^{(2)}, \alpha^{(3)}\}$ |
| $e_3$ | $\{\alpha^{(3)}\}$ |
| $e_8$ | $\{\alpha^{(1)}, \alpha^{(2)}, \alpha^{(3)}\}$ |
| $e_9$ | $\{\alpha^{(1)}\}$ |
| $e_{10}$ | $\{\alpha^{(1)}, \alpha^{(2)}\}$ |
| $e_{11}$ | $\{\alpha^{(1)}, \alpha^{(2)}\}$ |
| $e_{12}$ | $\{\alpha^{(3)}\}$ |
| $e_{13}$ | $\{\alpha^{(1)}, \alpha^{(2)}, \alpha^{(3)}\}$ |
| $e_{14}$ | $\{\alpha^{(1)}, \alpha^{(2)}, \alpha^{(3)}\}$ |
| $e_{15}$ | $\{\alpha^{(1)}, \alpha^{(2)}, \alpha^{(3)}\}$ |

LOOP 3

FIG. 16

LOOP 4

24A

| TRAJEC-TORY ID | ROUTE $\pi$ | DISSIMILARITY $\delta_\alpha(G)$ |
|---|---|---|
| $\alpha^{(1)}$ | $<e_1, e_9, e_{11}, e_{13}, e_{14}, e_{15}, e_8>$ | 4 |
| $\alpha^{(2)}$ | $<e_1, e_2, e_{10}, e_{11}, e_{13}, e_{14}, e_{15}, e_8>$ | 3 |
| $\alpha^{(3)}$ | $<e_1, e_2, e_3, e_{12}, e_{13}, e_{14}, e_{15}, e_8>$ | 3 |
| $\alpha^{(4)}$ | $<e_1, e_2, e_3, e_4, e_5, e_6, e_7, e_8>$ | 5 |

24B

| EDGE ID | TRAJECTORY DATA SET |
|---|---|
| $e_1$ | $\{\alpha^{(1)}, \alpha^{(2)}, \alpha^{(3)}, \alpha^{(4)}\}$ |
| $e_2$ | $\{\alpha^{(2)}, \alpha^{(3)}, \alpha^{(4)}\}$ |
| $e_3$ | $\{\alpha^{(3)}, \alpha^{(4)}\}$ |
| $e_4$ | $\{\alpha^{(4)}\}$ |
| $e_5$ | $\{\alpha^{(4)}\}$ |
| $e_6$ | $\{\alpha^{(4)}\}$ |
| $e_7$ | $\{\alpha^{(4)}\}$ |
| $e_8$ | $\{\alpha^{(1)}, \alpha^{(2)}, \alpha^{(3)}, \alpha^{(4)}\}$ |
| $e_9$ | $\{\alpha^{(1)}\}$ |
| $e_{10}$ | $\{\alpha^{(2)}\}$ |
| $e_{11}$ | $\{\alpha^{(1)}, \alpha^{(2)}\}$ |
| $e_{12}$ | $\{\alpha^{(3)}\}$ |
| $e_{13}$ | $\{\alpha^{(1)}, \alpha^{(2)}, \alpha^{(3)}\}$ |
| $e_{14}$ | $\{\alpha^{(1)}, \alpha^{(2)}, \alpha^{(3)}\}$ |
| $e_{15}$ | $\{\alpha^{(1)}, \alpha^{(2)}, \alpha^{(3)}\}$ |

APPARATUS AND METHOD FOR ONLINE GENERATION OF AN OPTIMUM ROUTE-GRAPH

CROSS-REFERENCE TO RELATED APPLICATION

This application is based upon and claims the benefit of priority of the prior Japanese Patent Application No. 2015-216883, filed on Nov. 4, 2015, the entire contents of which are incorporated herein by reference.

FIELD

The embodiment discussed herein is related to apparatus and method for online generation of an optimum route-graph.

BACKGROUND

In analysis of trajectory data of a moving body collected by a sensor such as a global positioning system (GPS), there has been disclosed a technique for generating a route graph from trajectory data.

For example, there has been proposed a method of dividing trajectory data acquired by the GPS into sections in each of which the trajectory data indicate similar movement directions of a moving body, and representing the sections as vectors. In this method, the vectors are clustered based on densities by using similarities and the vectors representing the respective clusters are connected, whereby a graph structure is extracted.

To minimize cost taking dissimilarity between a graph and a trajectory and complexity of the graph into account, there has been proposed a method of associating pieces of trajectory data with the graph based on a Frechet distance or the like and adding unassociated portions to the graph. To generate a route graph, this method starts from an empty graph, and involves performing the above processing once on each piece of the trajectory data.

Japanese Laid-open Patent Publication No. 2015-76069 is an example of the related art.

An example of the related art is described in Jae-Gil Lee, Jiawei Han, Kyu-Young Whang, "Trajectory Clustering: A Partition-and-Group Framework", SIGMOD '07, June 2007.

SUMMARY

According to an aspect of the invention, an apparatus stores plural pieces of trajectory information each indicating a trajectory and including plural pieces of position information indicating a position, and graph information on one or more planar graphs each including a plurality of nodes and a plurality of edges, where the graph information includes information on positions of the plurality of nodes and information on the plurality of edges connecting a pair of nodes among the plurality of nodes. The apparatus acquires a first piece of trajectory information from among the plural pieces of trajectory information, acquires a first planar graph from among the one or more planar graphs, and generates a second planar graph, based on the acquired first planar graph and the plural pieces of position information included in the acquired first piece of trajectory information. The apparatus extracts, from among the plural pieces of trajectory information, second pieces of trajectory information indicating trajectories passing a difference portion between the first planar graph and the second planar graph. For each of a group of candidate graphs that are each obtained by excluding a reduction set of edges included in the second planar graph from the second planar graph, the apparatus calculates optimality of the each candidate graph with which an addition set of trajectories indicated by the first piece of trajectory information and the second pieces of trajectory information are associated, and outputs one of the group of candidate graphs that is determined based on the calculated optimality.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a data structure of trajectory data, according to an embodiment;

FIG. 3 is a diagram illustrating an example of a route graph database, according to an embodiment;

FIG. 9 is a diagram illustrating an example of a management database, according to an embodiment;

FIG. 12 is a diagram illustrating an example of a management database, according to an embodiment;

FIG. 14 is a diagram illustrating an example of a management database, according to an embodiment;

FIG. 16 is a diagram illustrating an example of a management database, according to an embodiment.

DESCRIPTION OF EMBODIMENT

A method of extracting the graph structure through the clustering of the vectors obtained by dividing the trajectory data is batch processing. Therefore, the method may be unable to be applied to on-line processing for instantaneously reflecting flows of people, automobiles, and the like.

In the method of adding the pieces of the trajectory data to the route graph one by one, a piece of trajectory data to be added next is selected to optimize cost (optimality).

Therefore, to sufficiently optimize cost, the method requests to take into account the order of pieces of trajectory data to be added. Therefore, the method may be unable to be applied to on-line processing that may be unable to take into account the order of the addition.

It is preferable to generate, through online processing, a route graph in which optimality is optimized.

An example of an embodiment is explained in detail below with reference to the drawings.

Figure 1:
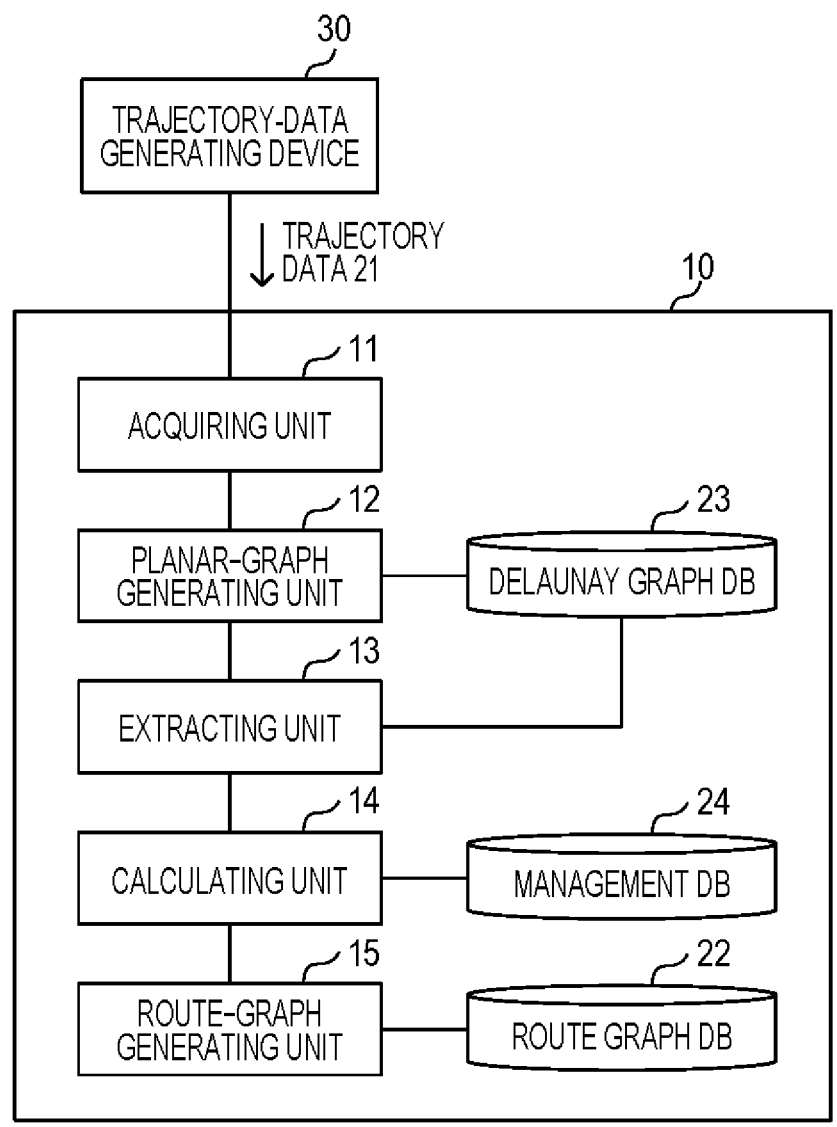
FIG. 1 is a diagram illustrating an example of a configuration of a route-graph generating apparatus, according to an embodiment.

As illustrated in FIG. 1, a route-graph generating apparatus 10 according to this embodiment receives trajectory data 21 as an input. The route-graph generating apparatus 10 updates, using the received trajectory data 21, a route graph G stored in a route graph database (DB) 22 to thereby generate a new route graph G.

The trajectory data 21 is a series of observation data indicating positions of a moving body observed by a sensor such as a GPS (Global Positioning System) at predetermined time intervals and is data representing a trajectory of movement of the moving body.

The observation data includes a sensor ID for identifying the sensor, position data (an x coordinate and a y coordinate) indicated by latitude and longitude of each of the observed positions, and observation time. The trajectory data 21 is obtained by extracting a plurality of observation data for each of sensor IDs and arranging, based on observation times, in time series, observation points included in the observation data. Note that, even if the sensor ID is the same, when the observation times at the observation points are different a predetermined time or more, the trajectory data is divided at the observation points. In this case, for example, by adding serial numbers to the sensor IDs, trajectory IDs capable of uniquely identifying the trajectory data are added to each of the trajectory data. In the following explanation, the trajectory data 21, the trajectory ID of which is $\alpha_i$, is referred to as "trajectory data $\alpha_i$" as well and a trajectory represented by the trajectory data $\alpha_i$ is referred to as "trajectory $\alpha_i$" as well.

For example, it is assumed that observation points included in the trajectory data $\alpha_i$ are $P_{i1}$, $P_{i2}$, ..., $P_{ij}$, ..., and $P_{iJ}$ (J is the number of observation points included in the trajectory data $\alpha_i$). In this case, the trajectory data $\alpha_i$ may be represented as $\alpha_i = \{P_{i1}, P_{i2}, ..., P_{ij}, ..., $ and $P_{iJ}\}$. Observation data indicating observation points includes a trajectory ID of the trajectory data 21 including the observation points, observation point IDs, which is identification information of the observation points, position data (x coordinates and y coordinates), and observation times. For example, observation data of the observation point $P_{ij}$ included in the trajectory data $\alpha_i$ may be represented as $P_{ij} = \{\alpha_i, P_{ij}, (x_{ij}, y_{ij}), s_{ij}\}$, where $(x_{ij}, y_{ij})$ is position data of the observation point $P_{ij}$ and $s_{ij}$ is observation time of the observation point $P_{ij}$. In FIG. 2, an example is illustrated in which the trajectory data 21 is represented by a data structure of a table format.

The route graph G is represented by a plurality of nodes, each representing position information, and edges that connect the nodes. The route graph DB 22 includes, for example, as illustrated in FIG. 3, a set of node information indicating nodes included in the route graph G and a set of edge information indicating the edges included in the route graph G. The node information includes, for example, identification information (note IDs) of the nodes and position data (x coordinates and y coordinates) of the nodes. The edge information includes identification information (edge IDs) of the edges and information concerning connected nodes represented by connecting, with "_(under bar)", the node IDs of the nodes connected by the edges. In the following explanation, an edge, the edge ID of which is $e_i$, is referred to as "edge $e_i$" as well.

An object of this embodiment is to generate, through online processing, a route graph G in which cost is optimized. Therefore, first, cost $\text{cost}_T(G)$ of Expression (1) below is defined as cost of the route graph G generated by adding a trajectory data set T. The route graph G is generated to minimize the cost $\text{cost}_T(G)$ of Expression (1).

$$\text{cost}_T(G) = \Sigma_{\alpha \in T} \delta_\alpha(G) + \lambda |G| \tag{1}$$

In the expression, $\lambda$ represents a constant ($\lambda$>0), $|G|$ represents complexity of the route graph G, and $\delta_\alpha(G)$ represents dissimilarity between the route graph G and the trajectory $\alpha$. The complexity of the route graph G may be set as, for example, the number of nodes, the number of edges, or a sum of edge lengths included in the route graph G. The dissimilarity $\delta_\alpha(G)$ may be set as, for example, a Frechet distance.

As explained above, in the method of adding trajectory data to a route graph one by one, when the order of the trajectory data to be added is not taken into account, cost may be unable to be sufficiently optimized. Therefore, it is also conceivable to, every time trajectory data is added, generate a route graph to optimize cost through batch processing using all trajectory data including trajectory data used in generating a route graph already generated. However, for example, when a data size is large, a large number of graphs are present as candidates of an optimum solution. Therefore, computational complexity for generation of a route group increases.

To suppress such an increase in the computational complexity, a steepest descent method, which is a method for calculating a local optimum solution, is applied to optimization of cost of the route graph G. In the steepest descent method, Expression (2) below is repeated until a solution $x^{(i)}$ converges. In the explanation, $\eta$ represents a constant.))

$$x^{(i+1)} = x^{(i)} - \eta \nabla f(x^{(i)}) \tag{2}$$

When Expression (2) is applied to the optimization of the cost of the route graph G, x=G=(V, E). V is a set of nodes v included in the route graph G. E is a set of edges e included in the route graph G. When Expression (2) is applied to the optimization of the cost of route graph G, $f(x) = \text{cost}_T(G)$. However, since the route graph G is a high-dimensional discrete value vector, $\nabla \text{cost}_T(G)$, which is differential, may be unable to be defined.

Therefore, in this embodiment, instead of the differential, $\Delta G$ is selected based on a difference $\Delta \text{cost}_{T,G}(\Delta G)$ defined by Expression (3) below and $\Delta G$ is updated like $G \leftarrow G - \Delta G$ to obtain a local optimum solution.

$$\Delta \text{cost}_{T,G}(\Delta G) = \{(\Sigma_{\alpha \in T}\delta_\alpha(G-\Delta G)+\lambda|G-\Delta G|)-(\Sigma_{\alpha \in T}\delta_\alpha(G)+\lambda|G|)\} = \Sigma_{\alpha \in T}[\delta_\alpha(G-\Delta G)-\delta_\alpha(G)]-\lambda[|G|-|G-\Delta G|] \tag{3}$$

A method of applying the steepest descent method to the optimization of the cost of the route graph G is specifically explained. First, a route graph $G^{(0)}$ serving as an initial solution is set. For example, a route graph $G^{(0)} = (V^{(0)}, E^{(0)})$ for minimizing dissimilarity $\Sigma_{\alpha \in T} \delta_\alpha(G)$ between the route graph G and a trajectory may be set as the initial solution.

Trajectory data $\alpha \in T_e$ passing an edge e included $G^{(i)} = (V^{(i)}, E^{(i)})$, which is a subgraph of the route graph $G^{(0)}$, is map-matched with a route graph $G^{(i)}_{\setminus \{e\}}$ that is set to prohibit passage of the edge e. In the following explanation, map-matching trajectory data passing the edge e with a route graph set to prohibit passage of the edge e is referred to as "reroute" as well. As a result of the reroute, a route graph obtained by leaving only edges that one or more trajectories pass is represented as G−ΔG.

Figure 4:
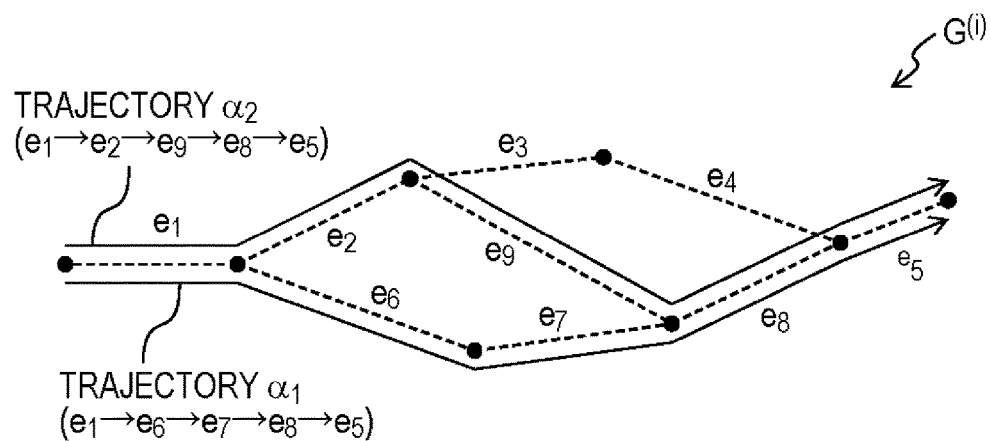
FIG. 4 is a diagram illustrating an example of specifying ΔG, according to an embodiment.
Figure 5:
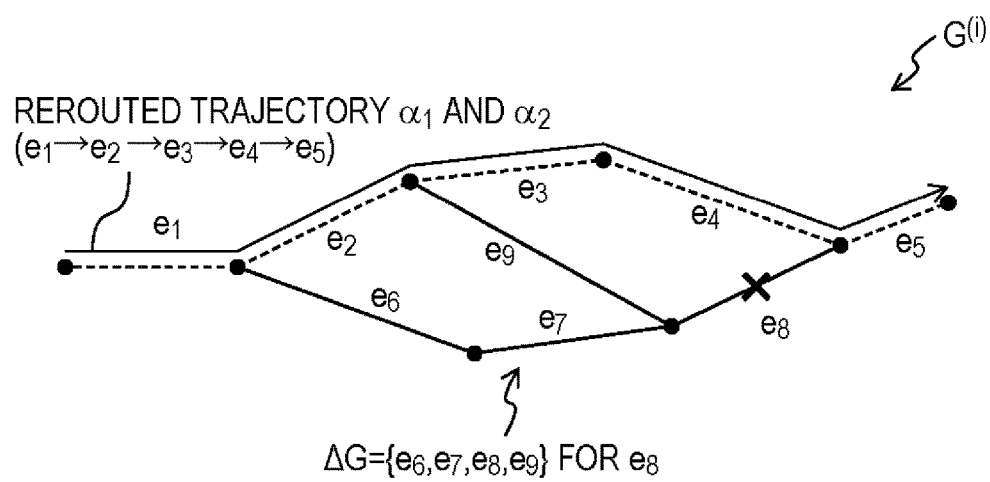
FIG. 5 is a diagram illustrating an example of specifying ΔG, according to an embodiment.

For example, as illustrated in FIG. 4, in a route subgraph (i) including edges $e_1$, $e_2$, $e_3$, $e_4$, $e_5$, $e_6$, $e_7$, $e_8$, and $e_9$, the edge $e_8$ is set to passage prohibition. It is assumed that trajectories passing the edge $e_8$ are a trajectory $\alpha_1$ and $\alpha_2$. It is assumed that a route obtained by map-matching the trajectory $\alpha_1$ with the route graph $G^{(i)}$ is the edge $e_1 \rightarrow e_6 \rightarrow e_7 \rightarrow e_8 \rightarrow e_5$ and a route obtained by map-matching the trajectory $\alpha_2$ to the route graph $G^{(i)}$ is the edge $e_1 \rightarrow e_2 \rightarrow e_9 \rightarrow e_8 \rightarrow e_5$. When the trajectories $\alpha_1$ and $\alpha_2$ are rerouted to a route graph $G^{(i)}_{\setminus \{e\}}$ in which the edge $e_8$ is set to passage prohibition, as illustrated in FIG. 5, it is assumed that both the trajectories are rerouted as the edge $e_1 \rightarrow e_2 \rightarrow e_3 \rightarrow e_4 \rightarrow e_5$. In this case, a graph $(G^{(i)} - \Delta G)$ obtained by leaving only edges that one or more trajectories of the rerouted trajectories $\alpha_1$ and $\alpha_2$ pass among the edges included in the route graph $G^{(i)}$ is $\{e_1, e_2, e_3, e_4, e_5\}$. Therefore, $\Delta G = \{e_6, e_7, e_8, e_9\}$.

In this way, ΔG is determined for every $e \in E^{(i)}$. Hereafter, ΔG will be also referred to as "a reduction set of edges". A set of trajectory data representing trajectories passing the edge e is represented as $T_e$. Among such candidates for ΔG, ΔG, whose cost satisfies predetermined conditions, is selected. As the predetermined conditions, for example, conditions described below may be determined.

(1) $\Delta cost_{T,G}(\Delta G) < 0$ and $\Delta cost_{T,G}(\Delta G)$ is minimum
(2) $\Delta cost_{T,G}(\Delta G) < 0$ and $|e|$ is maximum (or minimum)
(3) $\Delta cost_{T,G}(\Delta G) < 0$ and $|T_e|$ is minimum (or maximum)
(4) $\Delta cost_{T,G}(\Delta G) < 0$ and $|T_e| - \gamma |e|$ is minimum, where $\gamma > 0$ is a constant.

"$\Delta cost_{T,G}(\Delta G) < 0$" of the conditions indicates that dissimilarity between trajectory data and a graph (G−ΔG) is small compared with |ΔG|.

Note that map matching is required for calculation of ΔG and $\delta_\alpha(G-\Delta G)$ with respect to the edge $e \in E^{(i)}$ set to passage prohibition. Computational complexity of the map matching is generally large. In this embodiment, since $\delta_\alpha(G-\Delta G) = \delta_\alpha(G)$ with respect to $\alpha \in T-T_e$, Expression (4) below is obtained.

$$\Delta cost_{T,G}(\Delta G) = \Sigma_{\alpha \in T}[\delta_\alpha(G-\Delta G)-\delta_\alpha(G)]-\lambda[|G|-|G-\Delta G|] = \Sigma_{\alpha \in T_e}[\delta_\alpha(G-\Delta G)-\delta_\alpha(G)]+\Sigma_{\alpha \in T-T_e}[\delta_\alpha(G-\Delta G)-\delta_\alpha(G)]-\lambda[|G|-|G-\Delta G|] = \Sigma_{\alpha \in T_e}[\delta_\alpha(G-\Delta G)-\delta_\alpha(G)]-\lambda[|G|-|G-\Delta G|] \quad (4)$$

Therefore, it is possible to calculate $\Delta cost_{T,G}(\Delta G)$ only with the map matching of the trajectory data $\alpha \in T_e$ passing the edge set to passage prohibition without map-matching all the trajectory data $\alpha \in T$. A set $T_e$ of trajectory data is very small compared with the set T. Therefore, it is possible to substantially reduce the number of times of the map matching.

The optimization of cost of the route graph applied with the steepest descent method explained above is expanded to online processing.

When trajectory data is added to the generated route graph, the route graph $G^{(0)}$ serving as the initial solution is changed. Therefore, it might be considered desirable to apply the procedure explained above to all the trajectory data again. However, by applying the procedure only to a difference between the generated graph and a graph added with the trajectory data, it is possible to generate a route graph for optimizing cost through online processing.

For example, it is assumed that a route graph is generated from a Delaunay graph that includes observation points of trajectory data as Delaunay points. A Delaunay graph before addition of observation points is represented as $D^{(i)} = (U^{(i)}, F^{(i)})$ and a Delaunay graph after the addition of the observation points is represented as $D^{(i+1)} = (U^{(i+1)}, F^{(i+1)})$. Note that U represents a set of nodes (Delaunay points) included in the Delaunay graph and F represents a set of edges (Delaunay sides) included in the Delaunay graph. Since $|F^{(i)} \cap F^{(i+1)}|/|F^{(i)}|$ is not small, by focusing on a difference between $D^{(i)}$ and $D^{(i+1)}$, it is possible to generate the route graph G through the online processing without increasing computational complexity as in the batch processing.

Specifically, when $F^{(-)} = F^{(i)} - F^{(i+1)}$, it suffices to reroute trajectories passing $E^{(-)} = E^{(i)} \cap F^{(-)}$ and trajectories represented by trajectory data to be added among trajectories represented by trajectory data used for generation of the route graph $G^{(i)}$, to a Delaunay graph $D^{(i+1)}$. $F^{(-)}$ is a subset of edges, in a Voronoi diagram forming a dual graph of a Delaunay graph $D^{(i)}$, which each include as an end point a generation point of a Voronoi region including an observation point of trajectory data to be added. Therefore, the Delaunay graph $D^{(i+1)}$ may be calculated with computational complexity proportional to the number of generation points of the Voronoi regions including the observation points of the trajectory data to be added. The number of generation points does not exceed the number of observation points to be added. Therefore, it is possible to calculate $D^{(i+1)}$ with computational complexity proportional to the number of observation points to be added.

Consequently, it is possible to generate a route graph for optimizing cost with the computational complexity proportional to observation points to be added. Therefore, it is possible to generate a route graph in the online processing.

In this embodiment, as explained above, the route graph G is generated by the method of formulating the steepest descent method and expanding the steepest descent method to the online processing. Functional units of the route-graph generating apparatus 10 according to this embodiment are explained in detail below.

The route-graph generating apparatus 10 includes, as illustrated in FIG. 1, an acquiring unit 11, a planar graph generating unit 12, an extracting unit 13, a calculating unit 14, and a route-graph generating unit 15. In a predetermined storage region of the route-graph generating apparatus 10, a route graph DB 22, a Delaunay graph DB 23, and a management DB 24 are stored.

In the route graph DB 22, information on the route graph G explained above (e.g., FIG. 3) is stored. In the Delaunay graph DB 23, information on the Delaunay graph D generated by the planar graph generating unit 12 is stored. Like the data structure of the route graph G, a data structure of the Delaunay graph D includes plural pieces of node (Delaunay points) information and plural pieces of edge (Delaunay edges) information. In the management DB 24, information on trajectory data required for calculation of cost in the calculating unit 14 and generation of the route graph G in the route-graph generating unit 15 is stored.

The acquiring unit 11 acquires the trajectory data 21 one by one, for example, from the trajectory-data generating apparatus 30 that generates trajectory data from observation data of a GPS or the like acquired from a moving body. The acquiring unit 11 may acquire the trajectory data 21 not only from the trajectory-data generating apparatus 30 but also from other information processing apparatuses, an external storage device, an internal storage device, and the like. When an information processing apparatus, such as a car navigation system or a smartphone, mounted or held in the moving body has a function of generating trajectory data from observation data, the acquiring unit 11 may directly acquire the trajectory data from the information processing apparatus mounted or held in the moving body. The acquiring unit 11 passes the acquired trajectory data 21 to the planar graph generating unit 12.

The planar graph generating unit 12 reads, from the Delaunay graph DB 23, a Delaunay graph $D^{(t-1)}$ which was previously generated, adds observation points included in the trajectory data 21 passed from the acquiring unit 11 to the Delaunay graph $D^{(t-1)}$, and generates a Delaunay graph $D^{(t)}$. The planar graph generating unit 12 stores the generated Delaunay graph $D^{(t)}$ in the Delaunay graph DB 23 and passes the trajectory data 21 passed from the acquiring unit 11 to the extracting unit 13.

The extracting unit 13 generates a route graph $G^{(t-1/2)}$ by reflecting a difference between the Delaunay graph $D^{(t-1)}$ stored in the Delaunay graph DB 23 and the Delaunay graph $D^{(t)}$ on a route graph $G^{(t-1)}$. In this case, the extracting unit 13 specifies the edge set $F^{(-)}$ erased from the Delaunay graph $D^{(t)}$ in an edge set $F^{(t-1)}$ included in the Delaunay graph $D^{(t-1)}$. The extracting unit 13 extracts, from the trajectory data stored in the management DB 24, trajectory data passing any one of edges of the edge set $F^{(1)}$. The extracting unit 13 passes the extracted trajectory data, the trajectory data 21 passed from the acquiring unit 11, and the generated route graph $G^{(t-1/2)}$ to the calculating unit 14.

The calculating unit 14 reroutes each of trajectories represented by the respective trajectory data passed from the extracting unit 13, to a route graph $G^{(t-1/2)}_{\setminus\{e\}}$ in which edge e, which is passed by the each trajectory map-matched with the route graph $G^{(t-1/2)}$, is set to passage prohibition. The calculating unit 14 determines $\Delta G$ to be a portion where no trajectory passes as a result of the rerouting, and calculates, according to Expression (4), cost for a route graph $(G^{(t-1/2)}-\Delta G)$ which is a candidate for the route graph $G^{(t)}$.

The route-graph generating unit 15 specifies $\Delta G$ in which the cost calculated by the calculating unit 14 satisfies predetermined conditions and excludes edges included in $\Delta G$ from the route graph $G^{(t-1/2)}$ to generate the route graph $G^{(t)}$.

Figure 6:
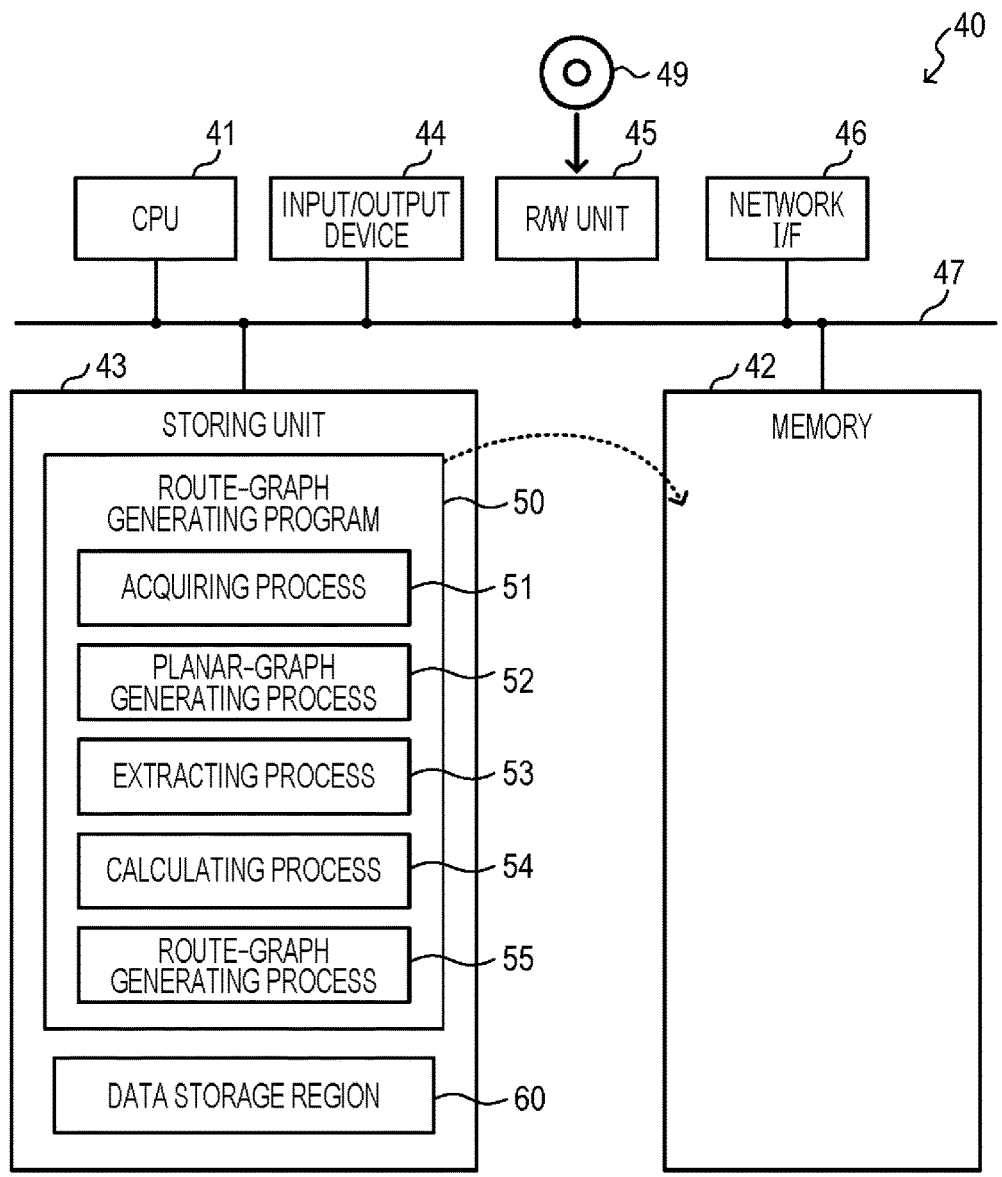
FIG. 6 is a diagram illustrating an example of a configuration of a computer that functions as a route-graph generating apparatus, according to an embodiment.

The route-graph generating apparatus 10 may be realized by, for example, a computer 40 illustrated in FIG. 6. The computer 40 includes a CPU 41, a memory 42 functioning as a temporary storage region, and a storing unit 43 that is nonvolatile. The computer 40 includes an input/output device 44 such as a display device or an input device. The computer 40 includes a read/write (R/W) unit 45 that controls reading and writing of data in and from a storage medium 49, and a network I/F 46 connected to a network such as the Internet. The CPU 41, the memory 42, the storing unit 43, the input/output device 44, the R/W unit 45, and the network I/F 46 are coupled to one another via a bus 47.

The storing unit 43 may be realized by a HDD (Hard Disk Drive), an SSD (solid state drive), a flash memory, or the like. In the storing unit 43 functioning as a storage medium, a route-graph generating program 50 for causing the computer 40 to function as the route-graph generating apparatus 10 is stored. The route-graph generating program 50 includes an acquiring process 51, a planar graph generating process 52, an extracting process 53, a calculating process 54, and a route-graph generating process 55. The storing unit 43 includes a data storage region 60 that stores information configuring the route graph DB 22, information configuring the Delaunay graph DB 23, information configuring the management DB 24, and the like.

The CPU 41 reads out the route-graph generating program 50 from the storing unit 43, develops the route-graph generating program 50 in the memory 42, and sequentially executes the processes included in the route-graph generating program 50. The CPU 41 reads out the information stored in the data storage region 60 and develops the route graph DB 22, the Delaunay graph DB 23, and the management DB 24 in the memory 42.

The CPU 41 executes the acquiring process 51 to operate as the acquiring unit 11 illustrated in FIG. 1. The CPU 41 executes the planar graph generating process 52 to operate as the planar graph generating unit 12 illustrated in FIG. 1. The CPU 41 executes the extracting process 53 to operate as the extracting unit 13 illustrated in FIG. 1. The CPU 41 executes the calculating process 54 to operate as the calculating unit 14 illustrated in FIG. 1.

The CPU 41 executes the route-graph generating process 55 to operate as the route-graph generating unit 15 illustrated in FIG. 1. Consequently, the computer 40 executing the route-graph generating program 50 functions as the route-graph generating apparatus 10.

Note that the functions realized by the route-graph generating program 50 may also be realized by, for example, a semiconductor integrated circuit, more specifically, an ASIC (Application Specific Integrated Circuit).

Figure 7:
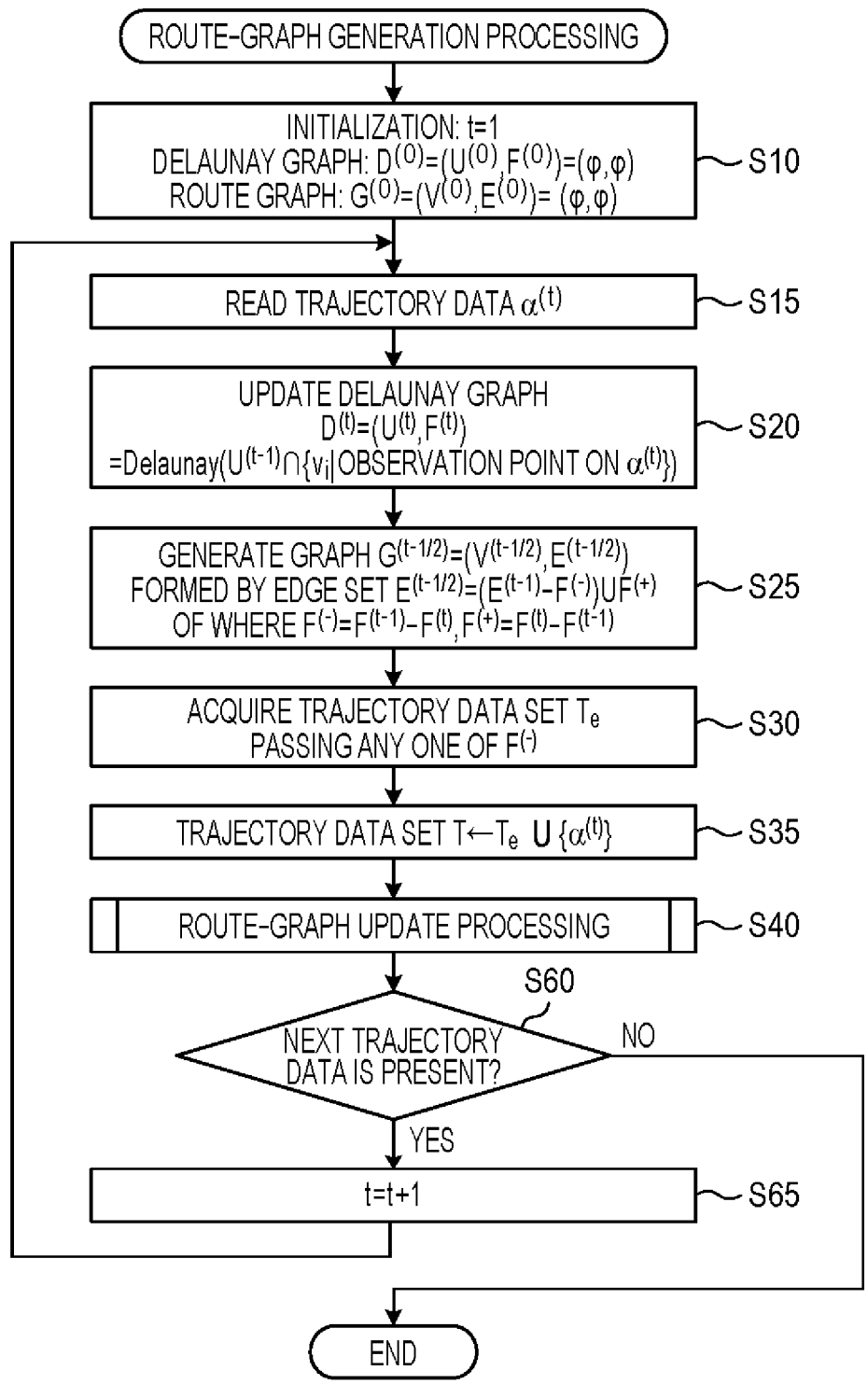
FIG. 7 is a diagram illustrating an example of an operational flowchart for route-graph generation processing, according to an embodiment.

Next, action of the route-graph generating apparatus 10 according to this embodiment is explained. When the trajectory data 21 is inputted to the route-graph generating apparatus 10, route-graph generation processing illustrated in FIG. 7 is executed in the route-graph generating apparatus 10. Note that the trajectory data 21 inputted to the route-graph generating apparatus 10 is once stored in a predetermined storage region.

In step S10 of the route-graph generation processing illustrated in FIG. 7, the acquiring unit 11 sets, at an initial value "1", a variable t indicating a sequence number of pieces of trajectory data that have been acquired to generate the route graph G. The acquiring unit 11 sets an empty graph as an initial value of a Delaunay graph generated by the planar graph generating unit 12. The Delaunay graph is represented as $D^{(0)}=(U^{(0)}, F^{(0)})=(\phi, \phi)$. As explained above, U represents a set of nodes (Delaunay points) included in the Delaunay graph and F represents a set of edges (Delaunay edges) included in the Delaunay graph. Further, the acquiring unit 11 sets an empty graph as an initial value of a route graph generated by the route-graph generating unit 15. The route graph is represented as $G^{(0)}=(V^{(0)}, E^{(0)})=(\phi, \phi)$. As explained above, V represents a set of nodes included in the route graph and E represents a set of edges included in the route graph.

Subsequently, in step S15, the acquiring unit 11 reads, from a predetermined storage region, trajectory data $\alpha^{(t)}$ inputted to the route-graph generating apparatus 10. The acquiring unit 11 passes the read trajectory data 21 to the planar graph generating unit 12.

Subsequently, in step S20, the planar graph generating unit 12 generates the Delaunay graph $D^{(t)}$ by reading, from the Delaunay graph DB 23, the Delaunay graph $D^{(t-1)}$ that was previously generated, and adding observation points included in the trajectory data $\alpha^{(t)}$ passed from the acquiring unit 11 to the Delaunay graph $D^{(t-1)}$. Specifically, the planar graph generating unit 12 erases edges that each includes as an end point a generation point of Voronoi regions to which observation points of the trajectory data $\alpha^{(t)}$ are added, where a node set $U^{(t-1)}$ of the Delaunay graph $D^{(t-1)}$ is composed of generation points of the Voronoi regions. A set of the edges to be erased is represented as $F^{(-)}$. That is, $F^{(-)}=F^{(t-1)}-F^{(t)}$.

The planar graph generating unit 12 generates, based on observation points $v_i$ (i=1, 2, . . . , I; I is a total number of observation points included in the trajectory data $\alpha^{(t)}$) of the added trajectory data $\alpha^{(t)}$, new node set $U^{(+)}$. Note that $U^{(+)}=U^{(t)}-U^{(t-1)}$. The planar graph generating unit 12 generates, based on the new node set $U^{(+)}$ and the erased edge set $F^{(-)}$, a new edge set $F^{(+)}$. Note that $F^{(+)}=F^{(t)}-F^{(t-1)}$. Consequently, the Delaunay graph $D^{(t)}=(U^{(t)}, F^{(t)})$ is generated.

Subsequently, in step S25, the planar graph generating unit 12 stores the generated Delaunay graph $D^{(t)}$ in the Delaunay graph DB 23 and passes the trajectory data 21 passed from the acquiring unit 11 to the extracting unit 13. The extracting unit 13 generates the route graph $G^{(t-1/2)}$ by reflecting a difference between the Delaunay graph $D^{(t-1)}$ stored in the Delaunay graph DB 23 and the Delaunay graph $D^{(t)}$ on the route graph $G^{(t-1)}$. Specifically, the extracting unit 13 generates the route graph $G^{(t-1/2)}=(V^{t-1/2}, E^{(t-1/2)})$ in which the edge set $E^{(t-1/2)}$ is obtained as a sum of sets of an edge set obtained by excluding the edge set $F^{(-)}$ from the edge set $E^{(t-1)}$ and the edge set $F^{(+)}$.

Subsequently, in step S30, the extracting unit 13 extracts trajectory data passing any one of the edges e of the edge set $F^{(-)}$ from the trajectory data stored in the management DB 24, that is, the trajectory data used for the generation of the route graph $G^{(t-1)}$. A set of the extracted trajectory data is represented as $T_e$.

Subsequently, in step S35, the extracting unit 13 passes the trajectory data set T obtained by adding the trajectory data $\alpha^{(t)}$ to the trajectory data set $T_e$ and the generated route graph $G^{(t-1/2)}$ to the calculating unit 14. In step S40, route-graph update processing is executed.

Figure 8:
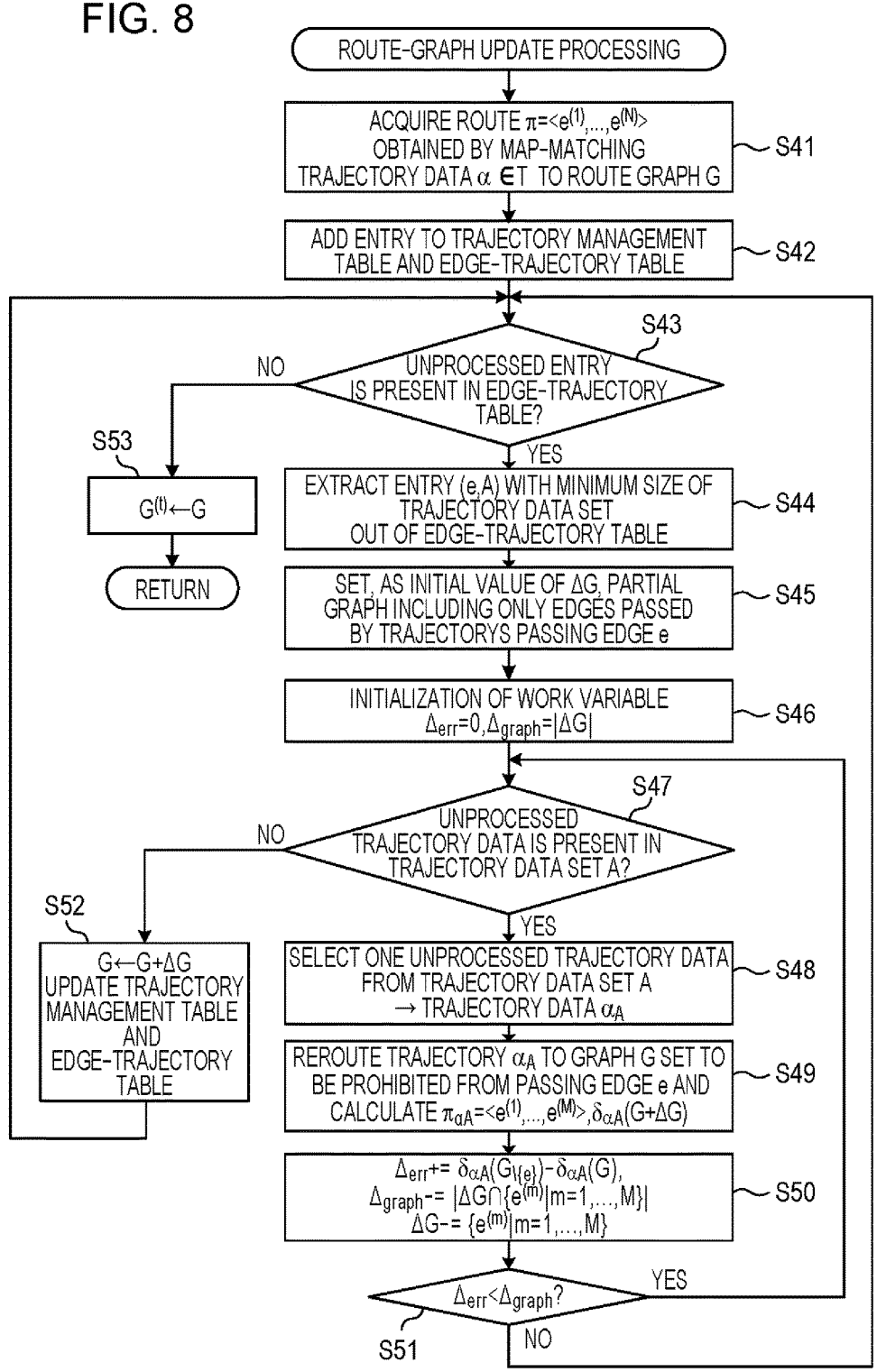
FIG. 8 is a diagram illustrating an example of an operational flowchart for route-graph update processing, according to an embodiment.

The route-graph update processing is explained with reference to FIG. 8.

In step S41, the calculating unit 14 sets the route graph $G^{(t-1/2)}$ as the route graph G. For a trajectory α represented by each piece of the rack data α included in the trajectory data set T, the calculating unit 14 acquires a route π= $<e^{(1)}, \ldots,$ and $e^{(N)}>$ obtained by map-matching the trajectory α with the route graph G. $e^{(1)}$ represents a top edge and $e^{(N)}$ represents an end edge at the time when the trajectory α is map-matched. The calculating unit 14 calculates dissimilarity $\delta_\alpha(G)$ between the trajectory α and the route graph G.

Subsequently, in step S42, the calculating unit 14 registers a result obtained by map-matching the trajectory a in a trajectory management table 24A and an edge-trajectory table 24B of the management DB 24. Examples of the trajectory management table 24A and the edge-trajectory table 24B are illustrated in FIG. 9. In the trajectory management table 24A, a trajectory ID of the trajectory data α representing the map-matched trajectory α, the route π obtained by the map matching, and the dissimilarity $\delta_\alpha(G)$ are stored in association with one another. The edge-trajectory table 24B is a table indicating a correspondence relation between edges included in the route graph G and trajectories passing the edges. In the edge-trajectory table 24B, entries associating edge IDs of the edges e and a set (a trajectory data set A) of trajectory IDs of the trajectory data α passing the edges e are stored.

Subsequently, in step S43, the calculating unit 14 determines whether an entry for which the following processing is not performed yet is present in the edge-trajectory table 24B. When an unprocessed entry is present, the processing shifts to step 544.

In step S44, the calculating unit 14 extracts an entry (e, A) in which a size of a trajectory data set is the smallest among the unprocessed entries in the edge-trajectory table 24B. The size of the trajectory data set is the smallest when the number of pieces of trajectory data included in the trajectory data set A or a sum of lengths of the pieces of trajectory data included in the trajectory data set A is the smallest. Note that the processing in this step is intended to meet the predetermined cost condition "(3) $\Delta cost_{T,G}(\Delta G)<0$ and $|T_e|$ is minimum (or maximum)" to be satisfied when ΔG is selected.

Subsequently, in step S45, the calculating unit 14 sets, as an initial value of ΔG, a partial graph including only edges that are passed by trajectories respectively represented by trajectory data included in the trajectory data set A for trajectories passing the edge e of the extracted entry.

Subsequently in step S46, the calculating unit 14 sets respective work variables $\Delta_{err}$ and $\Delta_{graph}$ at initial values. $\Delta_{err}$ is a work variable for calculating a first term $(\Sigma_{\alpha\in T}[\delta_\alpha(G-\Delta G)-\delta_\alpha(G)])$ of Expression (4). $\Delta_{graph}$ a work variable for calculating a second term $(\lambda[|G|-|G-\Delta G|])$ of Expression (4). The calculating unit 14 sets $\Delta_{err}=0$ and $\Delta_{graph}=|\Delta G|$ where $|\Delta G|$ is a sum of lengths of edges included in ΔG.

Subsequently, in step S47, the calculating unit 14 determines whether trajectory data for which the following processing is not performed yet is present in the trajectory data set A of the entry extracted in step S44. When unprocessed trajectory data is present, the processing shifts to step S48.

In step S48, the calculating unit 14 selects one piece of unprocessed trajectory data from the trajectory data set A, and sets the unprocessed piece of trajectory data as trajectory data $\alpha_A$.

Subsequently, in step S49, the calculating unit 14 obtains a route $\pi_{\alpha A}=<e^{(1)}, \ldots,$ and $e^{(M)}>$ by rerouting the trajectory $\alpha_A$ represented by the trajectory data $\alpha_A$ to the route graph $G_{\backslash\{e\}}$ in which edge e is prohibited from being passed. The calculating unit 14 calculates dissimilarity $\delta_{\alpha A}(G_{\backslash\{e\}})$ between the trajectory $\alpha_A$ and the route graph $G_{\backslash\{e\}}$ in which edge e is prohibited from being passed.

Subsequently, in step S50, the calculating unit 14 adds a difference between the dissimilarity $\delta_{\alpha A}(G_{\backslash\{e\}})$ and the dissimilarity $\delta_{\alpha A}(G)$ to $\Delta_{err}$. The calculating unit 14 acquires the dissimilarity $\delta_{\alpha A}(G)$ from the trajectory management table 24A. The calculating unit 14 subtracts, from $\Delta_{graph}$, a sum of lengths of edges that are common in both the edges included in ΔG and the edges included in the route $\pi_{\alpha A}$ obtained by rerouting the trajectory $\alpha_A$. Further, the calculating unit 14 excludes the edges included in the route $\pi_{\alpha A}$ from ΔG.

Subsequently, in step S51, the calculating unit 14 determines whether $\Delta_{err}$ is smaller than $\Delta_{graph}$. In the case of $\Delta_{err}<\Delta_{graph}$, the processing returns to step S47. In the case of $\Delta_{err}\geq\Delta_{graph}$, the processing returns to step S43.

In the case of using map matching in which $\delta_\alpha(G-\Delta G)-\delta_\alpha(G)$ is constantly non-negative, when trajectories represented by trajectory data included in the trajectory data set A are sequentially rerouted, $\Delta_{err}$ monotonously increases. Note that, in appropriate map matching such as a method of minimizing a Frechet distance, $\delta_\alpha(G-\Delta G)-\delta_\alpha(G)$ is constantly non-negative. $|G|-|G-\Delta G|$ is a sum of lengths of edges that the trajectories do not pass because of the rerouting. An upper limit value of $|G|-|G-\Delta G|$ is $|\Delta G|$. When the trajectories are sequentially rerouted, since trajectories that pass ΔG set earlier could be present, $\Delta_{graph}$ monotonously decreases. That is, when rerouting of the trajectory $\alpha_A$ represented by k-th piece of trajectory data $\alpha_A$ included in the trajectory data set A is completed, if $\Delta_{err}<\Delta_{graph}$ does not hold, $\Delta_{err}<\Delta_{graph}$ does not hold even if k+1-th and subsequent trajectories $\alpha_A$ are rerouted.

Therefore, by determining, according to the determination in step S51, whether the rerouting of the trajectory $\alpha_A$ represented by the remaining trajectory data $\alpha_A$ included in the trajectory data set A is continued, it is possible to reduce the number of times of processing of the rerouting (the map mapping) with large computational complexity. When negative determination is made in step S51, the candidate graph (G−ΔG) corresponding to the edge e of an entry being processed is excluded from candidates.

When it is determined in step S47 that trajectory data for which the following processing is not performed yet is absent in the trajectory data set A, the processing shifts to step S52. In step S52, the route-graph generating unit 15 excludes ΔG from the route graph G, updates the route graph G, and updates the trajectory management table 24A and the edge-trajectory table 24B. The processing returns to step S43.

When it is determined in step S43 that the unprocessed entry is absent in the edge-trajectory table 24B, the processing shifts to step S53. In step S53, the route-graph generating unit 15 set the present route graph G as the route graph $G^{(t)}$. The processing returns to the route-graph generation processing (FIG. 7).

Subsequently, in step S60 of the route-graph generation processing illustrated in FIG. 7, the acquiring unit 11 determines whether next trajectory data inputted to the route-graph generating apparatus 10 is present. When the next trajectory data is present, the processing shifts to step S65. The acquiring unit 11 increments t by 1, and the processing returns to step S15. On the other hand, when the next trajectory data is absent, the route-graph generation processing ends.

The route-graph generation processing is explained using a specific example.

Figure 10:
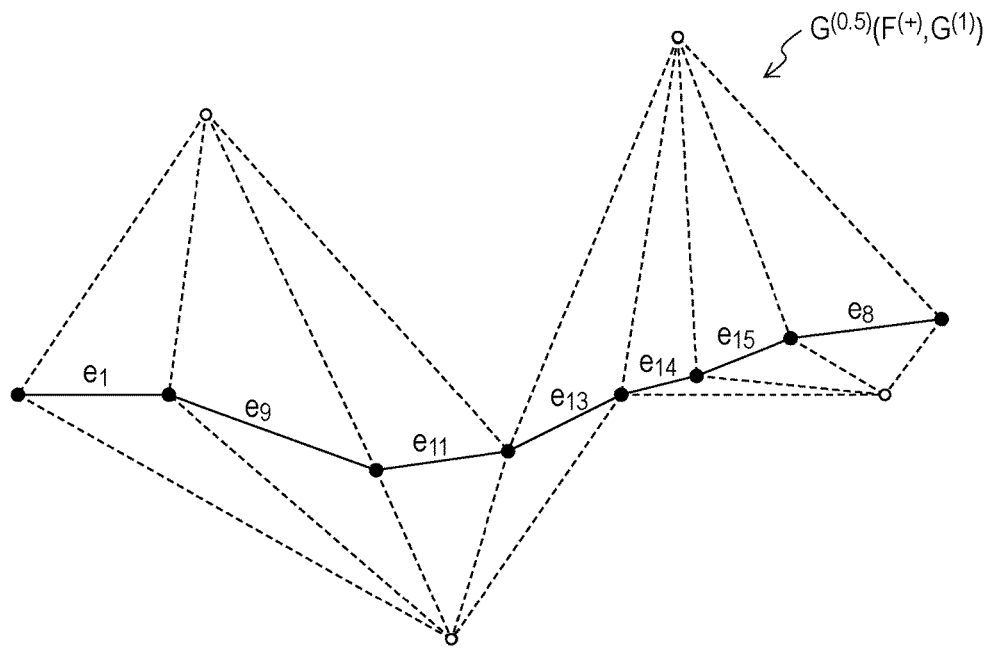
FIG. 10 is a diagram illustrating an example of a route graph $G^{(0.5)}$, according to an embodiment.

First, in a loop 1 (t=1), the acquiring unit 11 reads trajectory data $\alpha^{(1)}$ (S15). The planar graph generating unit 12 generates a Delaunay graph $D^{(1)}$ (S20). The extracting unit 13 generates a route graph $G^{(0.5)}$. An example of the route graph $G^{(0.5)}$ is illustrated in FIG. 10. In FIG. 10, groups of solid line edges and broken line edges (excluding edges each including a white circle node at one end) represent the route graph $G^{(0.5)}$. Edges $e_1$, $e_9$, $e_{11}$, $e_{13}$, $e_{14}$, $e_{15}$, and $e_8$ illustrated in FIG. 10 are the edge set $F^{(+)}$. Note that nodes indicated by black circles in FIG. 10 are nodes generated based on nodes of the Delaunay graph $D^{(1)}$ generated by observation points of the trajectory data $\alpha^{(1)}$. Nodes indicated by white circles in FIG. 10 are nodes that are provided, for convenience of drawing a diagram, in order to avoid complication of the Delaunay graph $D^{(1)}$ generated by the observation points of the trajectory data $\alpha^{(1)}$ and simplify explanation. The same applies in FIGS. 10, 11, 13, and 15.

Since $D^{(0)}=\phi$ (empty), the edge set $F^{(-)}$ erased from the previous Delaunay graph $D^{(0)}$ is absent. Therefore, the trajectory data set $T_e$ passing any one of the edges $F^{(-)}$ is $T^e=\phi$ (S30). Therefore, $T=\{\alpha^{(1)}\}$ is passed to the calculating unit 14 as the trajectory data set T; the route graph $G^{(0.5)}$ is set as the route graph G; and the route-graph update processing is executed (S40).

It is assumed that the trajectory data $\alpha^{(1)}$ is map-matched with the route graph G, the route $\pi=\langle e_1, e_9, e_{11}, e_{13}, e_{14}, e_{15}, e_8\rangle$ is obtained, and the dissimilarity $\delta_\alpha(G)=4$ is obtained (S41). In this case, the trajectory management table 24A and the edge-trajectory table 24B are updated as illustrated in FIG. 9 (S42).

It is assumed that an entry $(e_{15}, \{\alpha^{(1)}\})$ is extracted from the edge-trajectory table 24B (S44). In this case, an initial value of ΔG is set at $\Delta G=\{e_1, e_9, e_{11}, e_{13}, e_{14}, e_{15}, e_8\}$ (S45). The work variables are set so that $\Delta_{err}=0$ and $\Delta_{graph}=|\Delta G|=7$ (S46). Note that, in the following explanation, edge lengths are each regarded as "1" and it is assumed that a sum of the edge lengths=the number of edges.

Subsequently, the calculating unit 14 sets $\alpha^{(1)}$ to the trajectory data $\alpha_A$, based on the trajectory data set $A=\{\alpha^{(1)}\}$ (S48), and obtains a route $\pi_{\alpha A}$ by rerouting the trajectory $\alpha^{(1)}$ to a route graph $G_{\backslash\{e15\}}$ in which the edge $G_{\backslash\{e15\}}$ is set to passage prohibition (S49). In this case, since the route graph $G_{\backslash\{e15\}}$ is not a connected graph, trajectories represented by the trajectory data $\alpha_A$ are unable to be rerouted to the route graph $G_{\backslash\{e15\}}$. As a result, in this case, Dissimilarity $\delta_{\alpha A}(G_{\backslash\{e15\}})$ becomes ∞, and $\{e^{(m)}|m=1, \ldots, M\}$ becomes empty Subsequently, the calculating unit 14 updates $\Delta_{err}$ with $\Delta_{err}+(\delta_{\alpha A}(G_{\backslash\{e15\}})-\delta_{\alpha A}(G))=0+(\infty-4)=\infty$, and updates $\Delta_{graph}$ with $\Delta_{graph}-|\Delta G\cap\{e^{(m)}|m=1,\ldots,M\}|=7-0=7$ (S50). Further, the calculating unit 14 updates $\Delta G\{e_1, e_9, e_{11}, e_{13}, e_{14}, e_{15}, e_8\}$ with $\Delta G\{e_1, e_9, e_{11}, e_{13}, e_{14}, e_{15}, e_8\}$ (not changed) by excluding $\{e^{(m)}|m=1, \ldots, M\}$ (empty) from $\Delta G\{e_1, e_9, e_{11}, e_{13}, e_{14}, e_{15}, e_8\}$.

As explained above, since $\delta_{\alpha A}(G_{\backslash(e15)})$ is an extremely large value, $\Delta_{err}>\Delta_{graph}$. Negative determination is made in step S51, and the processing returns to step S43. As for the other entries included in the edge-trajectory table 24B, it is assumed that $\Delta_{err}>\Delta_{graph}$ as in the case of the entry (e15, $\{\alpha^{(1)}\}$). In this case, no edge is excluded from the route graph $G^{(0.5)}$ set as the route graph G, and $G^{(0.5)}$ as-is becomes the route graph $G^{(1)}$ (S53). That is, the solid line edge group illustrated in FIG. 10 represents the route graph $G^{(1)}$.

Figure 11:
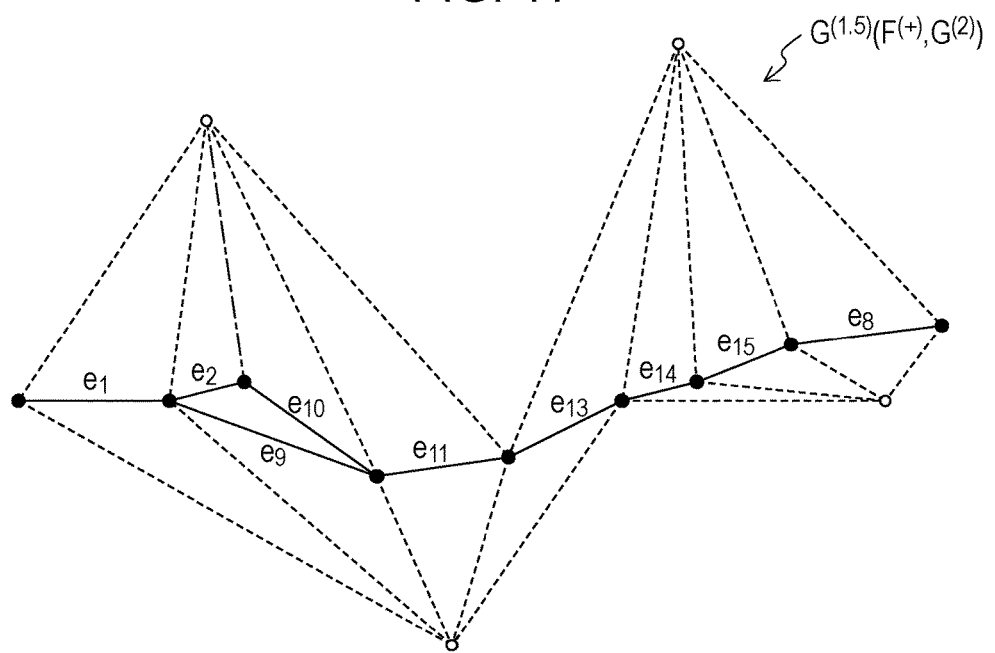
FIG. 11 is a diagram illustrating an example of a route graph $G^{(1.5)}$, according to an embodiment.

Subsequently, in a loop 2 (t=2), the acquiring unit 11 reads trajectory data $\alpha^{(2)}$ (S15). The planar graph generating unit 12 generates a Delaunay graph $D^{(2)}$ (S20). The extracting unit 13 generates a route graph $G^{(1.5)}$ (S20). An example of the route graph $G^{(1.5)}$ is illustrated in FIG. 11. In FIG. 11, groups of solid line edges, broken line edges, and alternate long and short dash line edges (excluding edges including white circle nodes at one ends) represent the route graph $G^{(1.5)}$. Edges $e_2$ and $e_{10}$ illustrated in FIG. 11 are the edge set $F^{(+)}$. By adding the trajectory data $\alpha^{(2)}$, the edge $e_2$, the edge $e_{10}$, the edges indicated by the alternate long and short dash line illustrated in FIG. 11 are added. It is assumed that the edge set $F^{(-)}$ composed of edges erased from the last Delaunay graph $D^{(1)}$ is absent (empty).

Since $F^{(-)}=\phi$, $T_e=99$ (S30). $T=\{\alpha^{(2)}\}$ is passed to the calculating unit 14 as the trajectory data set T, the route graph $G^{(1.5)}$ is set as the route graph G, and the route-graph update processing is executed (S40).

It is assumed that the trajectory data $\alpha^{(2)}$ is map-matched with the route graph G, the route $\pi=\langle e_1, e_2, e_{10}, e_{11}, e_{13}, e_{14}, e_{15}, e_8\rangle$ is obtained, and the dissimilarity $\delta_\alpha(G)=3$ is obtained (S41). In this case, the trajectory management table 24A and the edge-trajectory table 24B are updated as illustrated in FIG. 12 (S42).

It is assumed that an entry $(e_9, \{\alpha^{(1)}\})$ is extracted from the edge-trajectory table 24B (S44). In this case, an initial value of ΔG is set at $\Delta G=\{e_9\}$ (S45). The work variables are set so that $\Delta_{err}=0$ and $\Delta_{graph}=|\Delta G|=1$ (S46).

Subsequently, the calculating unit 14 sets $\alpha^{(1)}$ from the trajectory data set $A=\{\alpha^{(1)}\}$, to the trajectory data $\alpha_A$ (S48), and obtains the route $\pi_{\alpha A}$ by rerouting the trajectory $\alpha^{(1)}$ to a route graph $G_{\backslash\{e9\}}$ in which the edge $e_9$ is set to passage prohibition (S49). For example, it is assumed that $\pi_{\alpha A}=\langle e_1, e_2, e_{10}, e_{11}, e_{13}, e_{14}, e_{15}, e_8\rangle$ is obtained, and dissimilarity $\delta_{\alpha A}(G_{\backslash\{e9\}})=5.5$ is obtained.

Subsequently, the calculating unit 14 updates $\Delta_{err}$ with $\Delta_{err}+(\delta_{\alpha A}(G_{\backslash\{e9\}})-\delta_{\alpha A}(G))=0+(5.5-4)=1.5$, and updates $\Delta_{graph}$ with $\Delta_{graph}-|\Delta G\cap\{e^{(m)}|m=1,\ldots,M\}|=1-0=1$ (S50). Further, the calculating unit 14 updates $\Delta G=\{e_9\}$ as $\Delta G=\{e_9\}$ by excluding $\{e^{(m)}|m=1,\ldots M\}=\{e_1, e_2, e_{10}, e_{11}, e_{13}, e_{14}, e_{15}, e_8\}$ from $\Delta G=\{e_9\}$.

Since $\Delta_{err}=1.5>\Delta_{graph}=1$, negative determination is made in step S51, and the processing returns to step S43. As for the other entries included in the edge-trajectory table 24B, it is assumed that $\Delta_{err}>\Delta_{graph}$. In this case, no edge is excluded from the route graph $G^{(1.5)}$. $G^{(1.5)}$ as-is becomes the route graph $G^{(2)}$ (S53). That is, the solid line edge group illustrated in FIG. 11 represents the route graph $G^{(2)}$.

Figure 13:
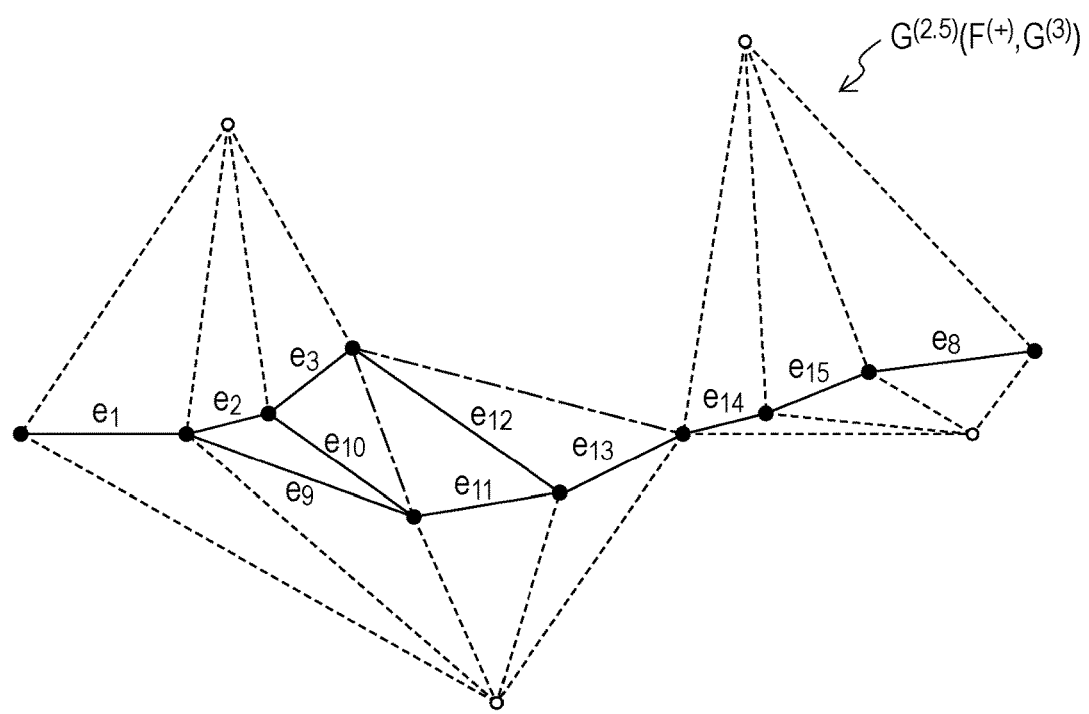
FIG. 13 is a diagram illustrating an example of a route graph $G^{(2.5)}$, according to an embodiment.

Subsequently, in a loop 3 (t=3), the acquiring unit 11 reads trajectory data $\alpha^{(3)}$ (S15). The planar graph generating unit 12 generates a Delaunay graph $D^{(3)}$ (S20). The extracting unit 13 generates a route graph $G^{(2.5)}$ (S20). An example of the route graph $G^{(2.5)}$ is illustrated in FIG. 13. In FIG. 13, groups of solid line edges, broken line edges, and alternate long and short dash line edges (excluding edges including white circle nodes at one ends) represent the route graph $G^{(2.5)}$. Edges $e_3$, $e_{12}$, and the alternate long and short dash line edge illustrated in FIG. 13 are the edge set $F^{(+)}$. By adding the trajectory data $\alpha^{(3)}$, the edge $e_3$, the edge $e_{12}$, and the edges indicated by the alternate long and short dash line illustrated in FIG. 13 are added. It is assumed that the edge set $F^{(-)}$ composed of edges, except the edges including the white circle nodes as the one ends, which are erased from the last Delaunay graph $D^{(2)}$, is absent (empty).

Since $F^{(-)}=\phi$, $T_e=\phi$ (S30). $T=\{\alpha^{(3)}\}$ is passed to the calculating unit 14 as the trajectory data set T, the route graph $G^{(2.5)}$ is set as the route graph G, and the route-graph update processing is executed (S40).

It is assumed that the trajectory data $\alpha^{(3)}$ is map-matched with the route graph G, the route $\pi=<e_1, e_2, e_3, e_{12}, e_{13}, e_{14}, e_{15}, e_8>$ is obtained, and the dissimilarity $\delta_\alpha(G)=3$ is obtained (S41). In this case, the trajectory management table 24A and the edge-trajectory table 24B are updated as illustrated in FIG. 14 (S42).

It is assumed that an entry $(e_9, \{\alpha^{(1)}\})$ is extracted from the edge trajectory table 24B (S44). In this case, an initial value of $\Delta G$ is set at $\Delta G=\{e_9\}$ (S45). The work variables are set so that $\Delta_{err}=0$ and $\Delta_{graph}=|\Delta G|=1$ (S46).

Subsequently, the calculating unit 14 sets $\alpha^{(1)}$ from the trajectory data set $A=\{\alpha^{(1)}\}$, to the trajectory data $\alpha_A$ (S48), and obtains a route $\pi_{\alpha A}$ by rerouting the trajectory $\alpha^{(1)}$ to a route graph $G_{\backslash\{e9\}}$ in which the edge $e_9$ is set to passage prohibition (S49). For example, it is assumed that $\pi_{\alpha A}=<e_1, e_2, e_3, e_{12}, e_{13}, e_{14}, e_{15}, e_8>$ is obtained, and dissimilarity $\delta_{\alpha A}(G_{\backslash\{e9\}})=5.8$ is obtained.

Subsequently, the calculating unit 14 updates $\Delta_{err}$ with $\Delta_{err}+(\delta_{\alpha A}(G_{\backslash\{e9\}})-\delta_{\alpha A}(G))=0+(5.8-4)=1.8$, and updates $\Delta_{graph}$ with $\Delta_{graph}-|\Delta G \cap \{e^{(m)}|m=1,\ldots,M\}|=1-0=1$ (S50). Further, the calculating unit 14 updates $\Delta G=\{e_9\}$ as $\Delta G=\{e_9\}$ by excluding $\{e^{(m)}|m=1,\ldots,M\}=\{e_1, e_2, e_3, e_{12}, e_{13}, e_{14}, e_{15}, e_8\}$ from $\Delta G=\{e_9\}$.

Since $\Delta_{err}=1.8>\Delta_{graph}=1$, negative determination is made in step S51, and the processing returns to step S43. As for the other entries included in the edge-trajectory table 24B, it is assumed that $\Delta_{err}>\Delta_{graph}$ as in the case of the entry $(e_9, \{\alpha^{(1)}\})$. In this case, no edge is excluded from the route graph $G^{(2.5)}$. $G^{(2.5)}$ as-is becomes the route graph $G^{(3)}$ (S53). That is, the solid line edge group illustrated in FIG. 13 represents the route graph $G^{(3)}$.

Figure 15:
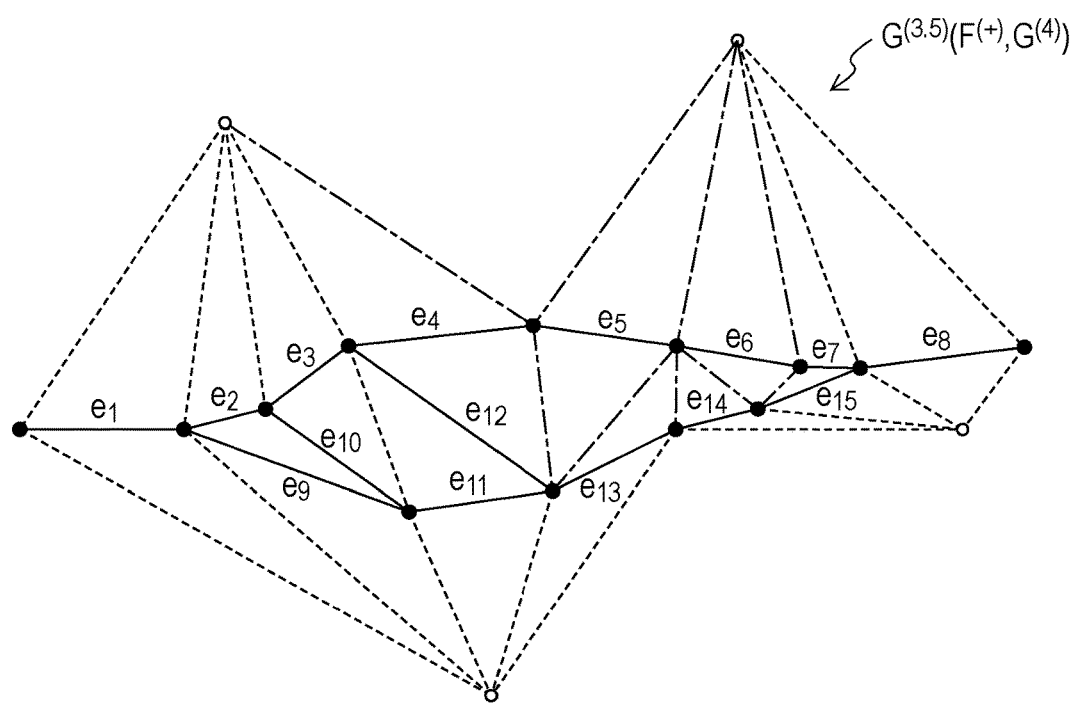
FIG. 15 is a diagram illustrating an example of a route graph $G^{(3.5)}$, according to an embodiment.

Subsequently, in a loop 4 (t=4), the acquiring unit 11 reads trajectory data $\alpha^{(4)}$ (S15). The planar graph generating unit 12 generates a Delaunay graph $D^{(4)}$ (S20). The extracting unit 13 generates a route graph $G^{(3.5)}$ (S20). An example of the route graph $G^{(3.5)}$ is illustrated in FIG. 15. In FIG. 15, groups of solid line edges, broken line edges, and alternate long and short dash line edges (excluding edges including white circle nodes at one ends) represent the route graph $G^{(3.5)}$. Edges $e_4$, $e_5$, $e_6$, $e_7$, and the alternate long and short dash line edges illustrated in FIG. 15 are the edge set $F^{(+)}$. By adding the trajectory data $\alpha^{(4)}$, the edge $e_4$, $e_5$, $e_6$, $e_7$, and the edges indicated by the alternate long and short dash line illustrated in FIG. 15 are added. It is assumed that the edge set $F^{(-)}$ composed of edges, except edges including the white circle nodes as the one ends, which are erased from the last Delaunay graph $D^{(3)}$, is absent (empty) (S30).

$T=\{\alpha^{(4)}\}$ is passed to the calculating unit 14 as the trajectory data set T, the route graph $G^{(3.5)}$ is set as the route graph G, and the route-graph update processing is executed (S40).

It is assumed that the trajectory data $\alpha^{(4)}$ is map-matched with the route graph G, the route $\pi=<e_1, e_2, e_3, e_4, e_5, e_6, e_7, e_8>$ is obtained, and the dissimilarity $\delta_\alpha(G)=5$ is obtained (S41). In this case, the trajectory management table 24A and the edge-trajectory table 24B are updated as illustrated in FIG. 16 (S42).

It is assumed that an entry $(e_{15}, \{\alpha^{(1)}, \alpha^{(2)}, \alpha^{(3)}\})$ is extracted from the edge-trajectory table 24B (S44). In this case, an initial value of $\Delta G$ is set at $\Delta G=\{e_9, e_{10}, e_{11}, e_{12}, e_{13}, e_{14}, e_{15}\}$ (S45). The work variables are set so that $\Delta_{err}=0$ and $\Delta_{graph}=|\Delta G|=7$ (S46).

Subsequently, the calculating unit 14 sets $\alpha^{(1)}$ from the trajectory data set $A=\{\alpha^{(1)}, \alpha^{(2)}, \alpha^{(3)}\}$, to the trajectory data $\alpha_A$ (S48), and obtains the route $\pi_{\alpha A}$ by rerouting the trajectory $\alpha^{(1)}$ to the route graph $G_{\backslash\{e15\}}$ in which the edge $e_{15}$ is set to passage prohibition (S49). For example, it is assumed that $\pi_{\alpha A}=<e_1, e_2, e_3, e_4, e_5, e_6, e_7, e_8>$ is obtained, and the dissimilarity $\delta_{\alpha A}(G_{\backslash\{e15\}})=5$ is obtained.

Subsequently, the calculating unit 14 updates $\Delta_{err}$ with $\Delta_{err}+(\delta_{\alpha A}(G_{\backslash\{e15\}})-\delta_{\alpha A}(G))=0+(5-4)=1$, and updates $\Delta_{graph}$ with $\Delta_{graph}-|\Delta G \cap \{e^{(m)}|m=1,\ldots,M\}|=7-0=7$ (S50). Further, the calculating unit 14 updates $\Delta G=\{e_9, e_{10}, e_{11}, e_{12}, e_{13}, e_{14}, e_{15}\}$ as $\Delta G=\{e_9, e_{10}, e_{11}, e_{12}, e_{13}, e_{14}, e_{15}\}$ by excluding $\{e^{(m)}|m=1,\ldots,M\}=\{e_1, e_2, e_3, e_4, e_5, e_6, e_7, e_8\}$ from $\Delta G=\{e_9, e_{10}, e_{11}, e_{12}, e_{13}, e_{14}, e_{15}\}$.

Since $\Delta_{err}=1<\Delta_{graph}=7$, affirmative determination is made in step S51. The processing returns to step S47.

Subsequently, the calculating unit 14 sets $\alpha^{(2)}$ from the trajectory data set $A=\{\alpha^{(1)}, \alpha^{(2)}, \alpha^{(3)}\}$, to the trajectory data $\Delta_A$ (S48), and obtains the route $\pi_{\alpha A}$ by rerouting the trajectory $\alpha^{(2)}$ to the route graph $G_{\backslash\{e15\}}$ in which the edge $e_{15}$ is set to passage prohibition (S49). For example, it is assumed that $\pi_{\alpha A}=<e_1, e_2, e_3, e_4, e_5, e_6, e_7, e_8>$ is obtained, and the dissimilarity $\delta_{\alpha A}(G_{\backslash\{e15\}})=5$ is obtained.

Subsequently, the calculating unit 14 updates $\Delta_{err}$ with $\Delta_{err}+(\delta_{\alpha A}(G_{\backslash\{e15\}})-\delta_{\alpha A}(G))=1+(5-3)=3$, and updates $\Delta_{graph}$ with $\Delta_{graph}-|\Delta G \cap \{e^{(m)}|m=1,\ldots,M\}|=7-0=7$ (S50). Further, the calculating unit 14 updates $\Delta G=\{e_9, e_{10}, e_{11}, e_{12}, e_{13}, e_{14}, e_{15}\}$ as $\Delta G=\{e_9, e_{10}, e_{11}, e_{12}, e_{13}, e_{14}, e_{15}\}$ by excluding $\{e^{(m)}|m=1,\ldots,M\}=\{e_1, e_2, e_3, e_4, e_5, e_6, e_7, e_8\}$ from $\Delta G=\{e_9, e_{10}, e_{11}, e_{12}, e_{13}, e_{14}, e_{15}\}$.

Since $\Delta_{err}=3<\Delta_{graph}=7$, affirmative determination is made in step S51. The processing returns to step S47.

Subsequently, the calculating unit 14 sets $\alpha^{(3)}$ from the trajectory data set $A=\{\alpha^{(1)}, \alpha^{(2)}, \alpha^{(3)}\}$, to the trajectory data $\alpha_A$ (S48), and obtains the route $\pi_{\alpha A}$ by rerouting the trajectory $\alpha^{(3)}$ to the route graph $G_{\backslash\{e15\}}$ in which the edge $e_{15}$ is set to passage prohibition (S49). For example, it is assumed that $\pi_{\alpha A}=<e_1, e_2, e_3, e_4, e_5, e_6, e_7, e_8>$ is obtained, and the dissimilarity $\delta_{\alpha A}(G_{\backslash\{e15\}})=5$ is obtained.

Subsequently, the calculating unit 14 updates $\Delta_{err}$ with $\Delta_{err}+(\delta_{\alpha A}(G_{\backslash\{e15\}})-\delta_{\alpha A}(G))=3+(5-3)=5$, and updates $\Delta_{graph}$ with $\Delta_{graph}-|\Delta G \cap \{e^{(m)}|m-1,\ldots,M\}|=7-0=7$ (S50). Further, the calculating unit 14 updates $\Delta G=\{e_9, e_{10}, e_{11},$ $e_{12}, e_{13}, e_{14}, e_{15}\}$ as $\Delta G=\{e_9, e_{10}, e_{11}, e_{12}, e_{13}, e_{14}, e_{15}\}$ by excluding $\{e^{(m)}|m=1, \ldots, M\}=\{e_1, e_2, e_3, e_4, e_5, e_6, e_7, e_8\}$ from $\Delta G=\{e_9, e_{10}, e_{11}, e_{12}, e_{13}, e_{14}, e_{15}\}$.

Since $\Delta_{err}=5<\Delta_{graph}=7$, affirmative determination is made in step S51. The processing returns to step S47. Since unprocessed trajectory data is absent in the trajectory data set A, the processing shifts to step S52. The route-graph generating unit 15 updates the route graph G by excluding $\Delta G=\{e_9, e_{10}, e_{12}, e_{13}, e_{14}, e_{15}\}$ from the route graph G. The route-graph generating unit 15 updates the trajectory management table 24 and the edge-trajectory table 24B. Specifically, first, concerning the trajectory data set $A=\{\alpha^{(1)}, \alpha^{(2)}, \alpha^{(3)}\}$, the route-graph generating unit 15 updates the route it and the dissimilarity $\delta_\alpha(G)$ of the trajectory management table 24A to $\pi_{\alpha 4}$ and $\delta_{\alpha 4}(G)$, respectively. Subsequently, after excluding entries of $\Delta G=\{e_9, e_{10}, e_{11}, e_{12}, e_{13}, e_{14}, e_{15}\}$ from the edge-trajectory table 24B, concerning the trajectory data set $A=\{\alpha^{(1)}, \alpha^{(2)}, \alpha^{(3)}\}$, the route-graph generating unit 15 updates an entry of the route $\pi_{\alpha 4}=<e(1), e(2), \ldots, e(m)>$.

As explained above, with the route-graph generating apparatus according to this embodiment, only trajectory data passing a difference between a generated route graph and a planar graph obtained by adding trajectory data to the route graph is map-matched to generate a route graph in which cost is optimized. Consequently, compared with a case where a route graph is generated from all trajectory data by batch processing in order to optimize cost, it is possible to reduce the number of map matching with large computational complexity. Therefore, it is possible to generate, through online processing, a route graph G in which cost is optimized. Since the number of times of the map matching may be reduced, it is possible to deal with the case of processing a large amount of trajectory data.

In this embodiment, with respect to a route graph defined as a source of a space of a high-dimensional discrete value, a difference of cost is defined taking into account dissimilarity between the route graph and trajectory data and complexity of the route graph, and the steepest descent method, which is an algorithm of an online type, is applied. Consequently, it is possible to obtain a local optimum solution of a route graph in which cost is optimized. Therefore, it is possible to more efficiently realize the online processing.

In this embodiment, it is possible to generate a route graph with only trajectory data. That is, if only a condition that the trajectory data is series data of observation points is satisfied, without depending on inherent characteristics such as speed and an observation interval of observation data of a moving body mounted with a sensor such as a GPS, it is possible to generate, through the online processing, a route graph in which cost is optimized.

Since the route graph in which cost is optimized may be generated by the online processing, it is possible to carry out analysis of trajectory data on a real time basis. For example, it is possible to predict traffic jams, instantaneously detect occurrence of accidents and troubles, and analyze changes in flows of people and cars involved in the traffic jams, the accidents, and the troubles on a real time basis.

Note that, in the embodiment, the map matching of trajectory data is performed for each of the trajectory data. However, the embodiment is not limited to this. Since results of map matching of different trajectory data do not depend on each other, the map matching may be executed in parallel using threads or sub-processes that share a graph G-$\Delta G$. Consequently, it is possible to further reduce a processing time for generation of a route graph.

In the embodiment, a Delaunay graph is updated using all of noses of a generated Delaunay graph and observation points of trajectory data to be added. However, the embodiment is not limited to this. The Delaunay graph may be updated using, for example, nodes and observation points extracted from all of the nodes and the observation points by sampling using a random number. Consequently, it is possible to reduce computational complexity of the map matching and the number of times of repetition of the steepest descent method.

In the embodiment, a graph serving as an initial solution is empty. However, a route graph already generated from a plurality of trajectory data, digital road network data, a triangular lattice graph, a square lattice graph, a Delaunay graph including any points as Delaunay points, and the like may be used. In particular, when the digital road network data, the triangular lattice graph, and the square lattice graph are used, it is possible to omit the planar graph generating unit. In this case, $D^{(t)}$ is typically $D^{(t-1)}$ and $F^{(-)}$ is typically $\phi$. In step S30, $T_e=\phi$. In this case, as the edge set $F^{(+)}$, edges at the time when $\alpha^{(t)}$ is map-matched with $D^{(t)}$ are set.

A graph generated by the planar graph generating unit is not limited to a Delaunay graph and only has to be a planar graph.

In the above explanation, the form is explained in which the route-graph generating program 50 is stored (installed) in the storing unit 43 in advance. However, the embodiment is not limited to this. The program related to the disclosed technique may also be provided in a form in which the program is recorded in a recording medium such as a CD-ROM, a DVD-ROM, or a USB memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A route-graph generating method of causing a computer to execute an online process comprising:
   providing plural pieces of trajectory information each indicating a trajectory of movement of a moving body and including plural pieces of position information indicating positions of the moving body that are observed by a sensor at predetermined time intervals, and graph information on one or more planar graphs each including a plurality of nodes and a plurality of edges, the graph information including information on positions of the plurality of nodes that are able to be associated with the positions of the moving body by performing a map-matching process and information on the plurality of edges connecting a pair of nodes among the plurality of nodes;
   acquiring a first piece of trajectory information from among the plural pieces of trajectory information;
   acquiring a first planar graph from among the one or more planar graphs by referring to the graph information;
   generating a second planar graph, based on the acquired first planar graph and the plural pieces of position information included in the acquired first piece of trajectory information;

extracting, from among the plural pieces of trajectory information, second pieces of trajectory information indicating trajectories passing a difference portion between the first planar graph and the second planar graph;

obtaining a group of candidate graphs by excluding a reduction set of edges included in the second planar graph from the second planar graph;

for each of the obtained group of candidate graphs, calculating optimality of each candidate graph with which an addition set of trajectories indicated by the first piece of trajectory information and the second pieces of trajectory information are associated by performing the map-matching process; and outputting one of the group of candidate graphs that is determined based on the calculated optimality, as a route graph which are associated with the first piece of trajectory information and whose cost is optimized.

2. The route-graph generating method of claim 1, the process further comprising:

for each of edges that are passed by the addition set of trajectories in the second planar graph with which the addition set of trajectories are associated by performing the map-matching process, re-associating the addition set of trajectories with the second planar graph by performing the map-matching process under a condition that each edge is prohibited to be passed by a trajectory to be associated;

determining the reduction set of edges to be edges that are passed by none of the addition set of trajectories re-associated with the second planar graph under the condition; and obtaining the candidate graph by excluding the determined reduction set of edges from the second planar graph.

3. The route-graph generating method of claim 1, wherein, the second planar graph is generated as a Delaunay graph whose Delaunay points consists of the plurality of nodes included in the first planar graph and positions indicated by the plural pieces of position information included in the first piece of trajectory information.

4. The route-graph generating method of claim 1, wherein the optimality is represented by using complexity of the candidate graph and dissimilarity between the candidate graph and each of the addition set of trajectories.

5. The route-graph generating method of claim 4, wherein the optimality is represented by using a difference in the complexity and a difference in the dissimilarity before and after exclusion of the reduction set of edges from the second planar graph.

6. The route-graph generating method of claim 5, wherein, the optimality of the candidate graph is calculated each time any one of the addition set of trajectories is re-associated with the candidate graph by performing the map-matching process; and when a difference in the complexity is larger than a difference in the dissimilarity, the candidate graph is excluded from the group of candidate graphs without associating trajectories remaining in the addition set of trajectories by performing the map-matching process.

7. The route-graph generating method of claim 1, wherein, the second planar graph is generated as a Delaunay graph whose Delaunay points consists of positions indicated by the plural pieces of position information included in the first piece of trajectory information and points sampled from the plurality of nodes included in the first planar graph.

8. The route-graph generating method of claim 1, wherein an initial value for the first planar graph is set at any one of an empty graph, a route graph generated from the plural pieces of trajectory information, digital road network data, a triangular lattice graph, a square lattice graph, and a Delaunay graph including predetermined points as Delaunay points.

9. A route-graph generating apparatus comprising:

a memory configured to store:

plural pieces of trajectory information each indicating a trajectory of movement of a moving body and including plural pieces of position information indicating positions of the moving body that are observed by a sensor at predetermined time intervals, and graph information on one or more planar graphs each including a plurality of nodes and a plurality of edges, the graph information including information on positions of the plurality of nodes that are able to be associated with the positions of the moving body by performing a map-matching process and information on the plurality of edges connecting a pair of nodes among the plurality of nodes;

a processor coupled to the memory and configured to:

acquire a first piece of trajectory information from among the plural pieces of trajectory information stored in the memory, acquire a first planar graph from among the one or more planar graphs by referring to the memory, generate a second planar graph, based on the acquired first planar graph and the plural pieces of position information included in the acquired first piece of trajectory information, extract, from among the plural pieces of trajectory information, second pieces of trajectory information indicating trajectories passing a difference portion between the first planar graph and the second planar graph, obtain a group of candidate graphs by excluding a reduction set of edges included in the second planar graph from the second planar graph, for each of the obtained group of candidate graphs, calculate optimality of each candidate graph with which an addition set of trajectories indicated by the first piece of trajectory information and the second pieces of trajectory information are associated by performing the map-matching process, and output one of the group of candidate graphs that is determined based on the calculated optimality, as a route graph which are associated with the first piece of trajectory information and whose cost is optimized.

10. The route-graph generating apparatus of claim 9, wherein, the processor is further configured to:

for each of edges that are passed by the addition set of trajectories in the second planar graph with which the addition set of trajectories are associated by performing the map-matching process, re-associate the addition set of trajectories with the second planar graph by performing the map-matching process under a condition that each edge is prohibited to be passed by a trajectory to be associated;

determine the reduction set of edges to be edges that are passed by none of the addition set of trajectories re-associated with the second planar graph under the condition; and obtain the candidate graph by excluding the determined reduction set of edges from the second planar graph.

11. The route-graph generating apparatus of claim 9, wherein the second planar graph is generated as a Delaunay graph whose Delaunay points consists of the plurality of nodes included in the first planar graph and positions indicated by the plural pieces of position information included in the first piece of trajectory information.

12. The route-graph generating apparatus of claim 9, wherein the optimality is represented by using complexity of the candidate graph and dissimilarity between the candidate graph and each of the addition set of trajectories.

13. The route-graph generating apparatus of claim 12, wherein the optimality is represented by using a difference in the complexity and a difference in the dissimilarity before and after exclusion of the reduction set of edges from the second planar graph.

14. The route-graph generating apparatus of claim 13, wherein the optimality of the candidate graph is calculated each time any one of the addition set of trajectories is re-associated with the candidate graph by performing the map-matching process; and when a difference in the complexity is larger than a difference in the dissimilarity, the candidate graph is excluded from the group of candidate graphs without associating trajectories remaining in the addition set of trajectories by performing the map-matching process.

15. A non-transitory, computer-readable recording medium having stored therein a program for causing a computer to execute an online process, the online process comprising:

providing plural pieces of trajectory information each indicating a trajectory of movement of a moving body and including plural pieces of position information indicating positions of the moving body that are observed by a sensor at predetermined time intervals, and graph information on one or more planar graphs each including a plurality of nodes and a plurality of edges, the graph information including information on positions of the plurality of nodes that are able to be associated with the positions of the moving body by performing a map-matching process and information on the plurality of edges connecting a pair of nodes among the plurality of nodes;

acquiring a first piece of trajectory information from among the plural pieces of trajectory information;

acquiring a first planar graph from among the one or more planar graphs by referring to the graph information;

generating a second planar graph, based on the acquired first planar graph and the plural pieces of position information included in the acquired first piece of trajectory information;

extracting, from among the plural pieces of trajectory information, second pieces of trajectory information indicating trajectories passing a difference portion between the first planar graph and the second planar graph;

obtaining a group of candidate graphs by excluding a reduction set of edges included in the second planar graph from the second planar graph;

for each of the obtained group of candidate graphs, calculating optimality of each candidate graph with which an addition set of trajectories indicated by the first piece of trajectory information and the second pieces of trajectory information are associated by performing the map-matching process; and outputting one of the group of candidate graphs that is determined based on the calculated optimality, as a route graph which are associated with the first piece of trajectory information and whose cost is optimized.

16. The non-transitory, computer-readable recording medium of claim 15, the process further comprising:

for each of edges that are passed by the addition set of trajectories in the second planar graph with which the addition set of trajectories are associated by performing the map-matching process, re-associating the addition set of trajectories with the second planar graph by performing the map-matching process under a condition that each edge is prohibited to be passed by a trajectory to be associated;

determining the reduction set of edges to be edges that are passed by none of the addition set of trajectories re-associated with the second planar graph under the condition; and obtaining the candidate graph by excluding the determined reduction set of edges from the second planar graph.

17. The non-transitory, computer-readable recording medium of claim 15, wherein the second planar graph is generated as a Delaunay graph whose Delaunay points consists of the plurality of nodes included in the first planar graph and positions indicated by the plural pieces of position information included in the first piece of trajectory information.

18. The non-transitory, computer-readable recording medium of claim 15, wherein the optimality is represented by using complexity of the candidate graph and dissimilarity between the candidate graph and each of the addition set of trajectories.

19. The non-transitory, computer-readable recording medium of claim 18, wherein the optimality is represented by using a difference in the complexity and a difference in the dissimilarity before and after exclusion of the reduction set of edges from the second planar graph.

20. The non-transitory, computer-readable recording medium of claim 19, wherein the optimality of the candidate graph is calculated each time any one of the addition set of trajectories is re-associated with the candidate graph by performing the map-matching process; and when a difference in the complexity is larger than a difference in the dissimilarity, the candidate graph is excluded from the group of candidate graphs without associating trajectories remaining in the addition set of trajectories by performing the map-matching process.

* * * * *